May 11, 1948.  G. W. BLAIR ET AL  2,441,235
APPARATUS FOR MAKING SPONGE RUBBER ARTICLES
Filed Oct. 8, 1941  14 Sheets-Sheet 1
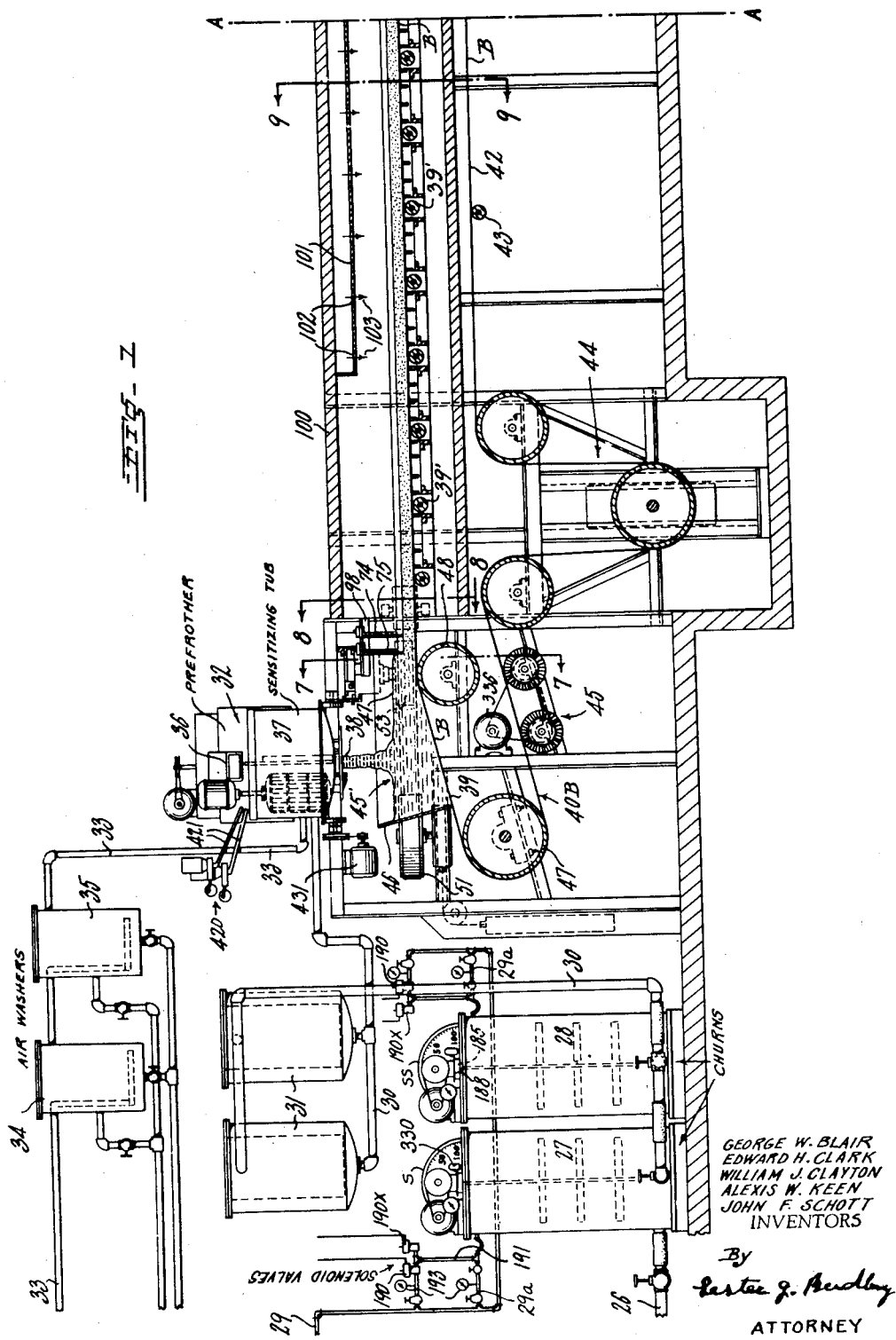
GEORGE W. BLAIR
EDWARD H. CLARK
WILLIAM J. CLAYTON
ALEXIS W. KEEN
JOHN F. SCHOTT
INVENTORS
ATTORNEY

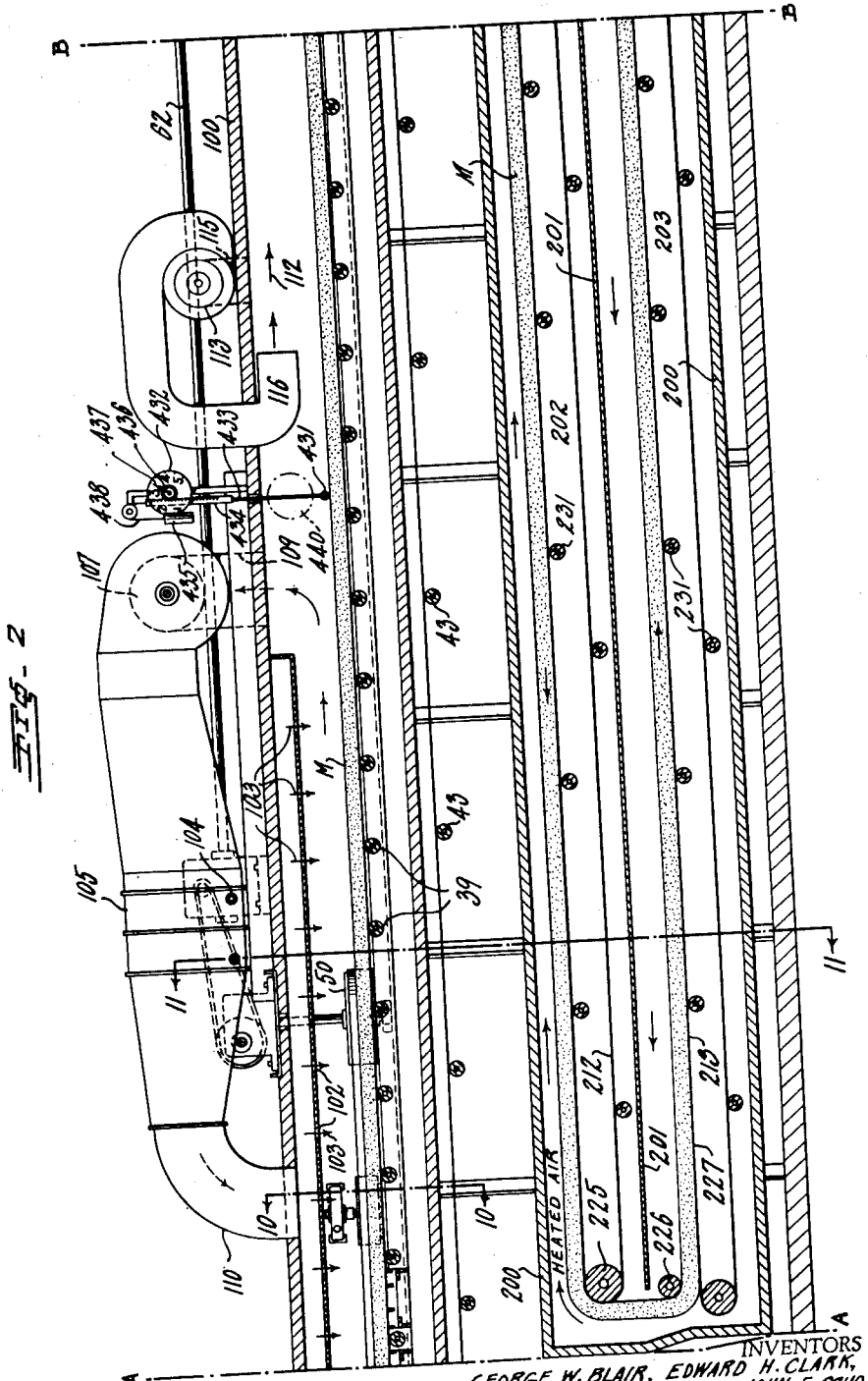

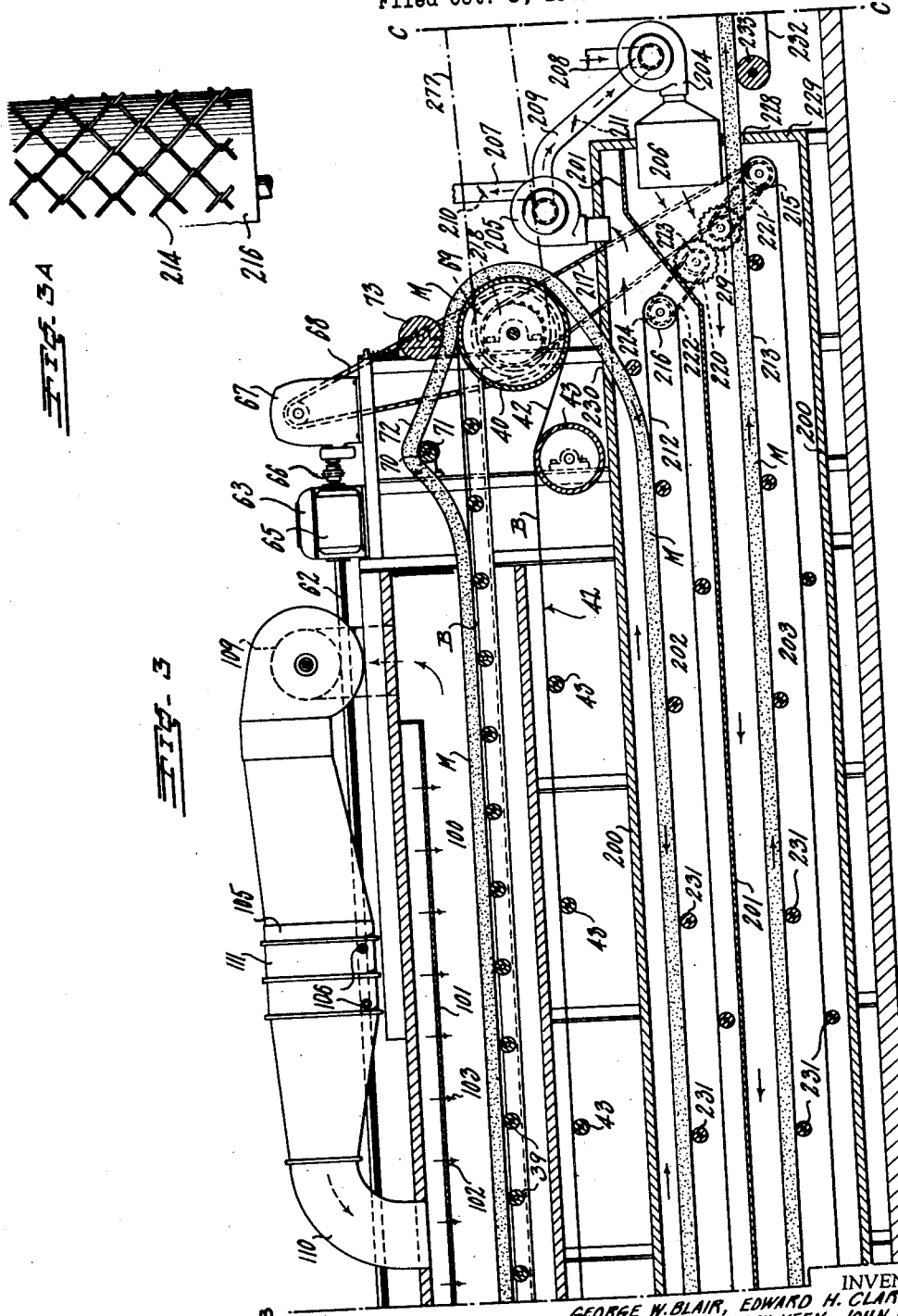

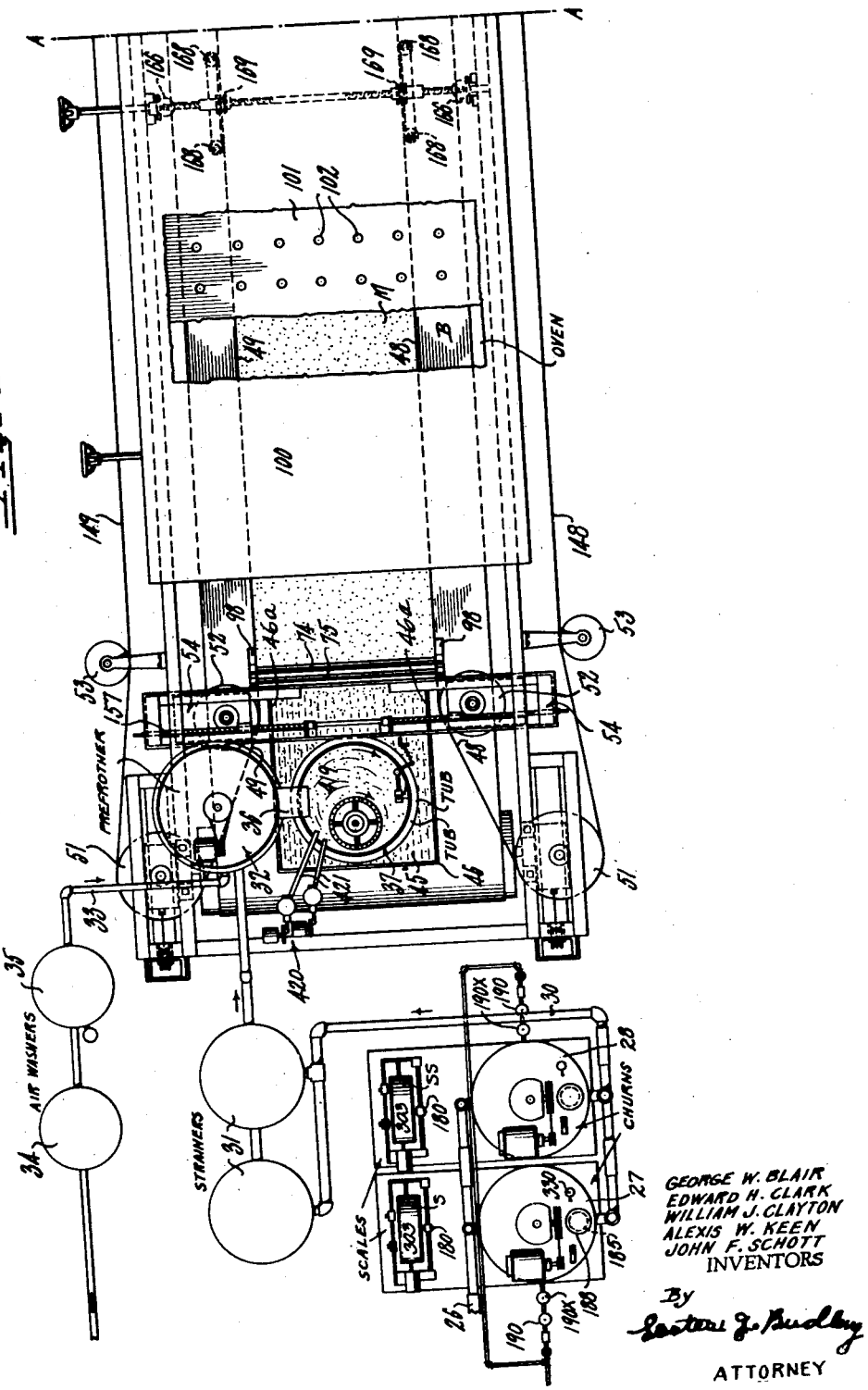

May 11, 1948.  G. W. BLAIR ET AL  2,441,235
APPARATUS FOR MAKING SPONGE RUBBER ARTICLES
Filed Oct. 8, 1941  14 Sheets-Sheet 5
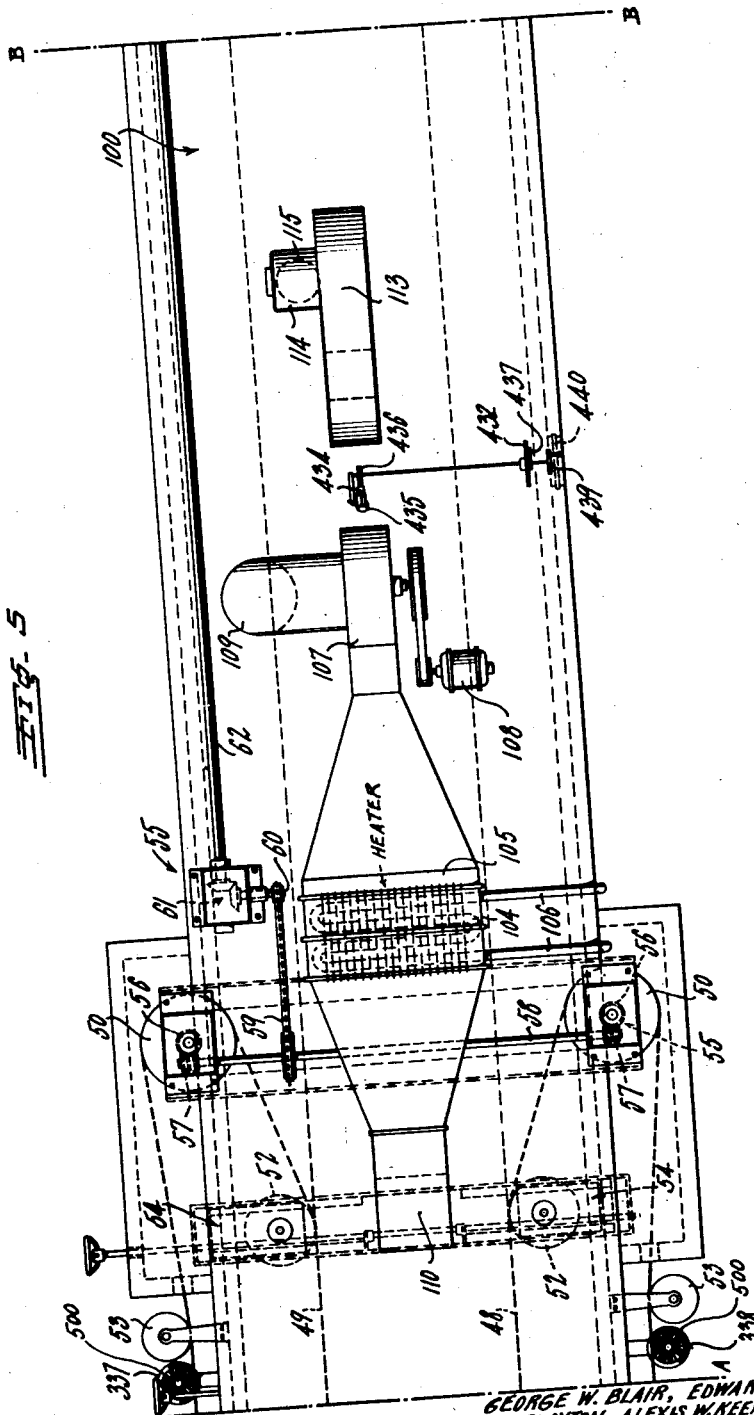
INVENTORS
GEORGE W. BLAIR, EDWARD H. CLARK,
WILLIAM J. CLAYTON, ALEXIS W. KEEN, JOHN F. SCHOTT
BY
ATTORNEY

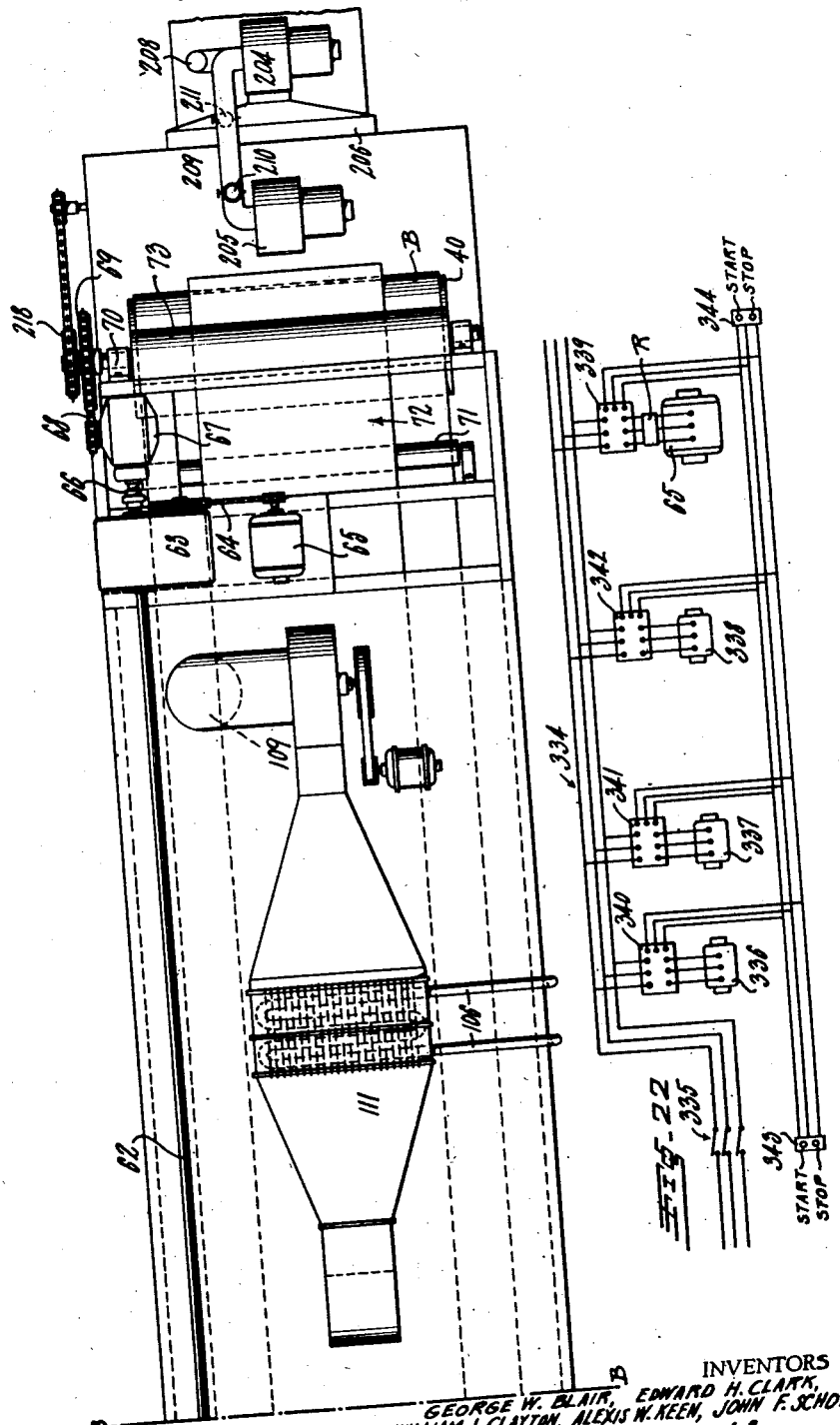

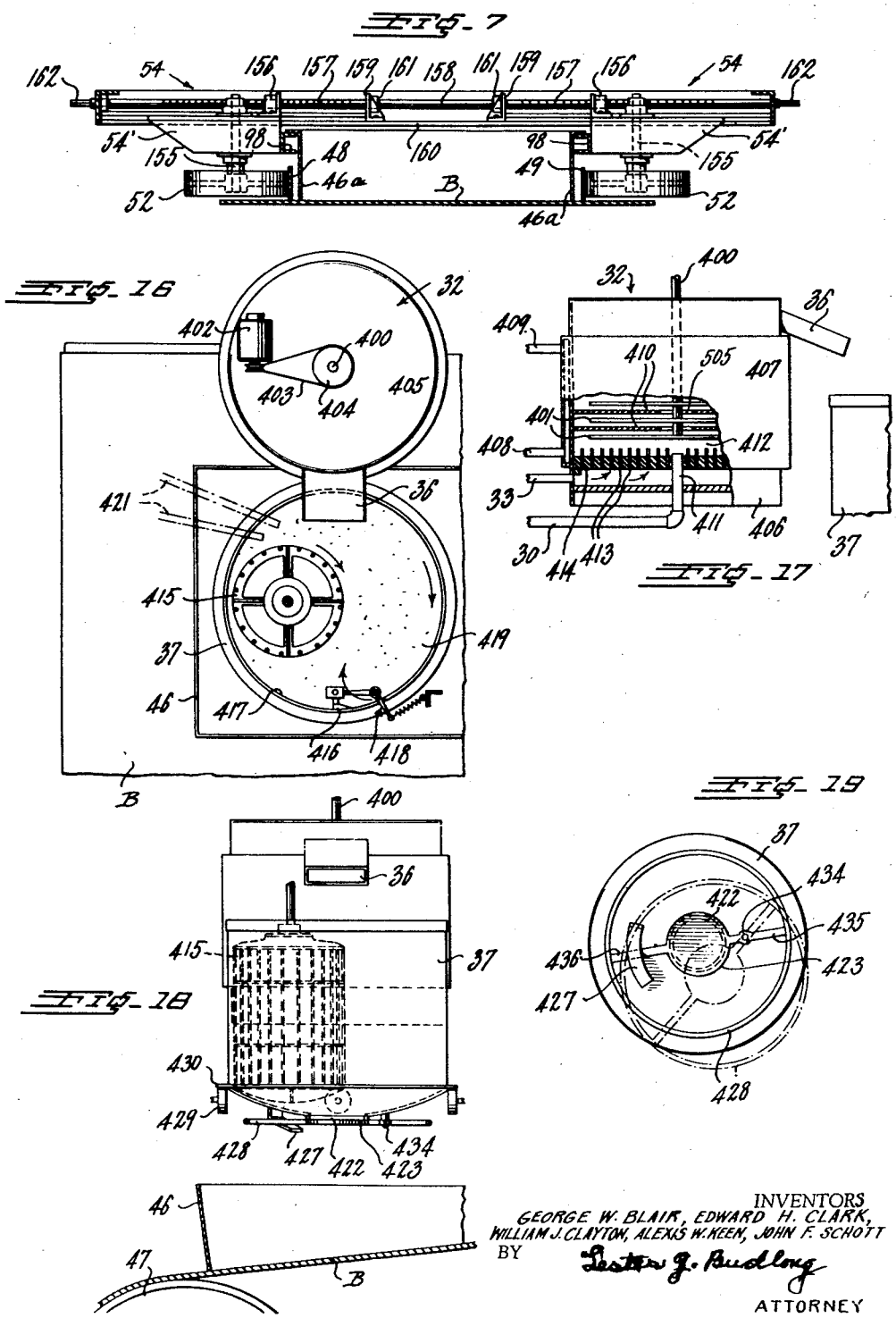

May 11, 1948.　　　　G. W. BLAIR ET AL　　　　2,441,235
APPARATUS FOR MAKING SPONGE RUBBER ARTICLES
Filed Oct. 8, 1941　　　14 Sheets-Sheet 8

INVENTORS
GEORGE W. BLAIR, EDWARD H. CLARK,
WILLIAM J. CLAYTON, ALEXIS W. KEEN, JOHN F. SCHOTT
BY Lester J. Budlong
ATTORNEY

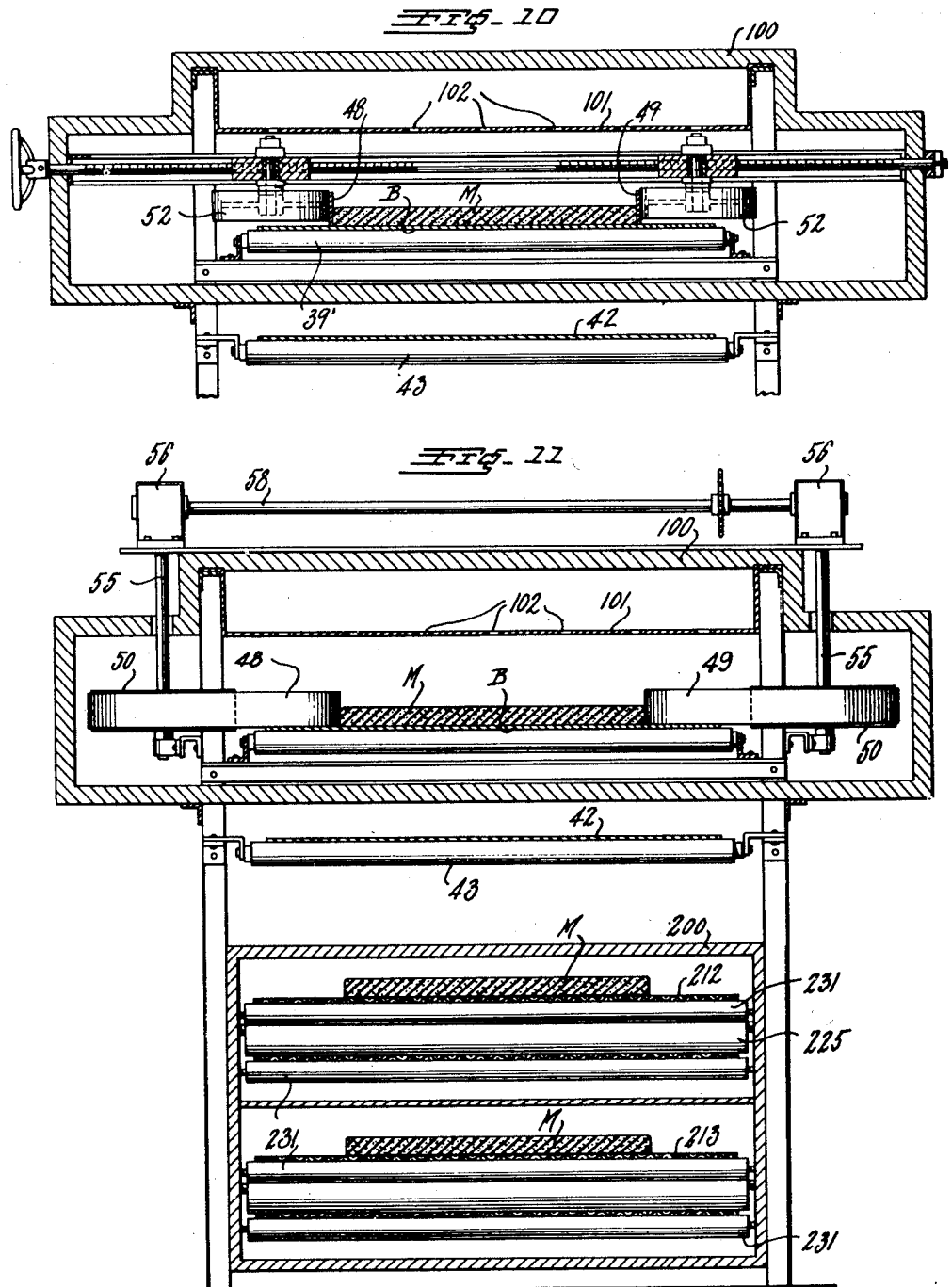

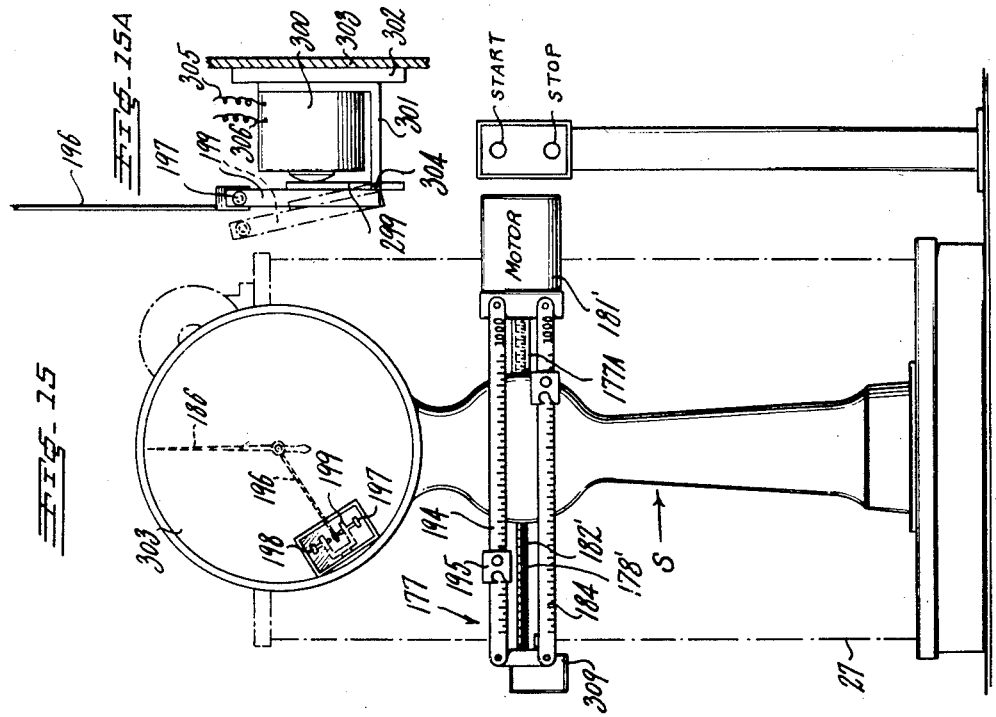
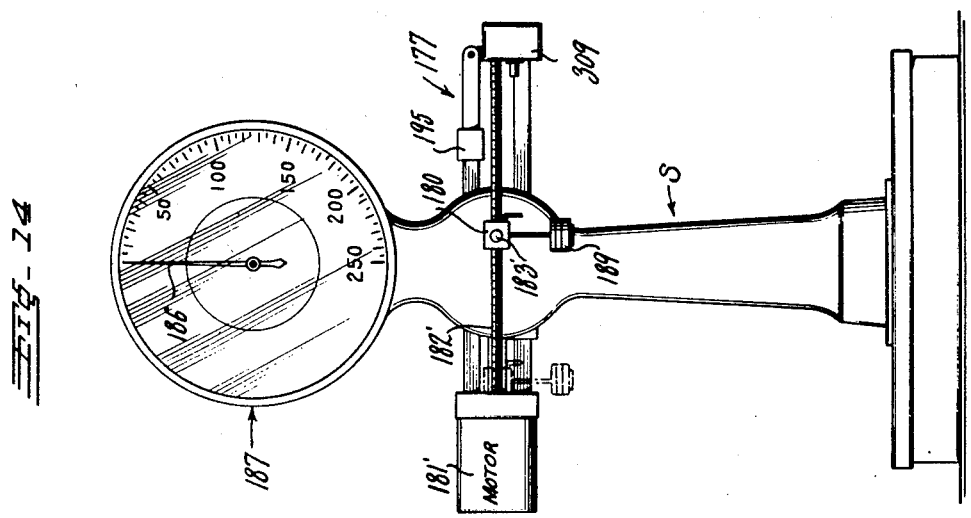

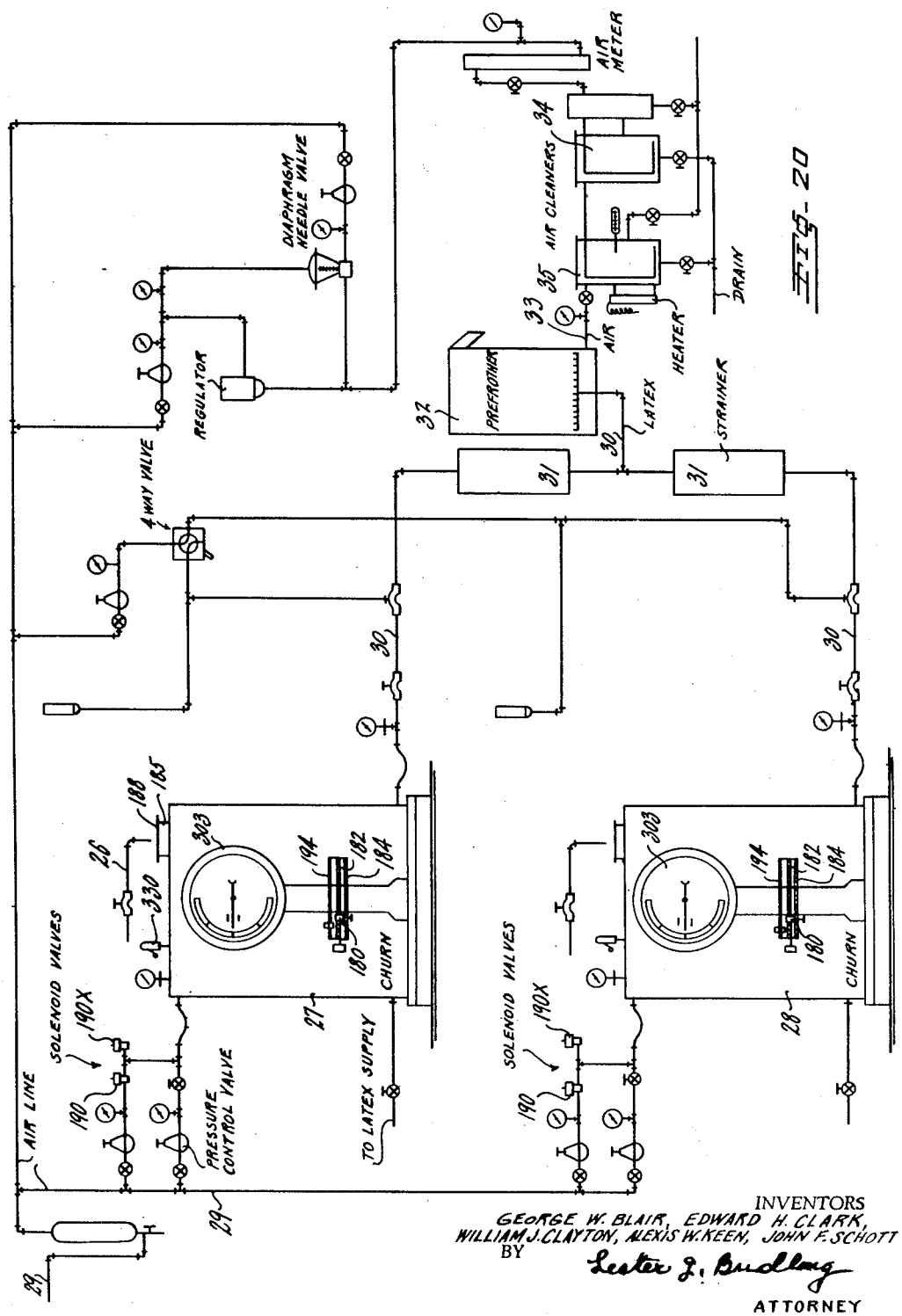

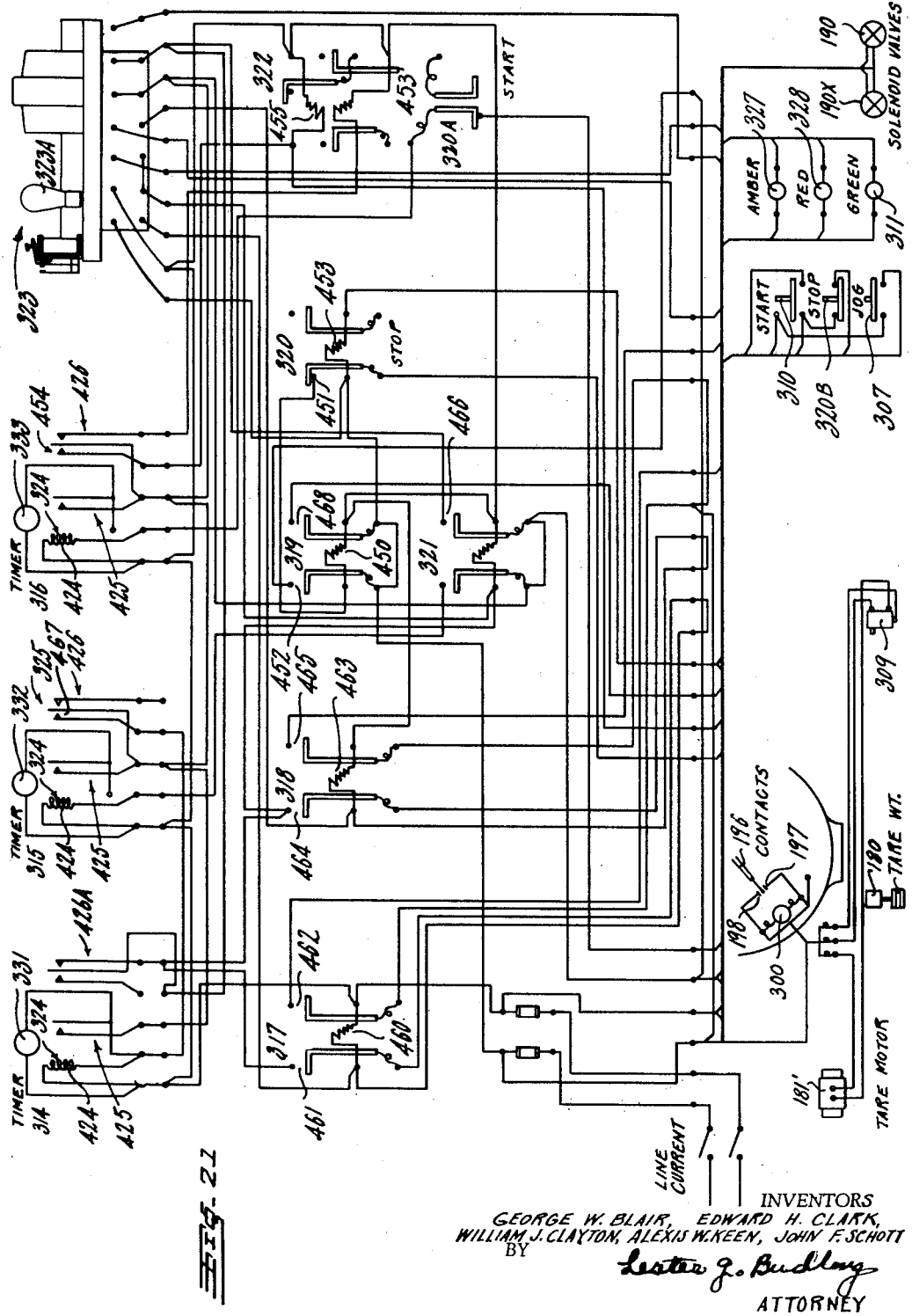

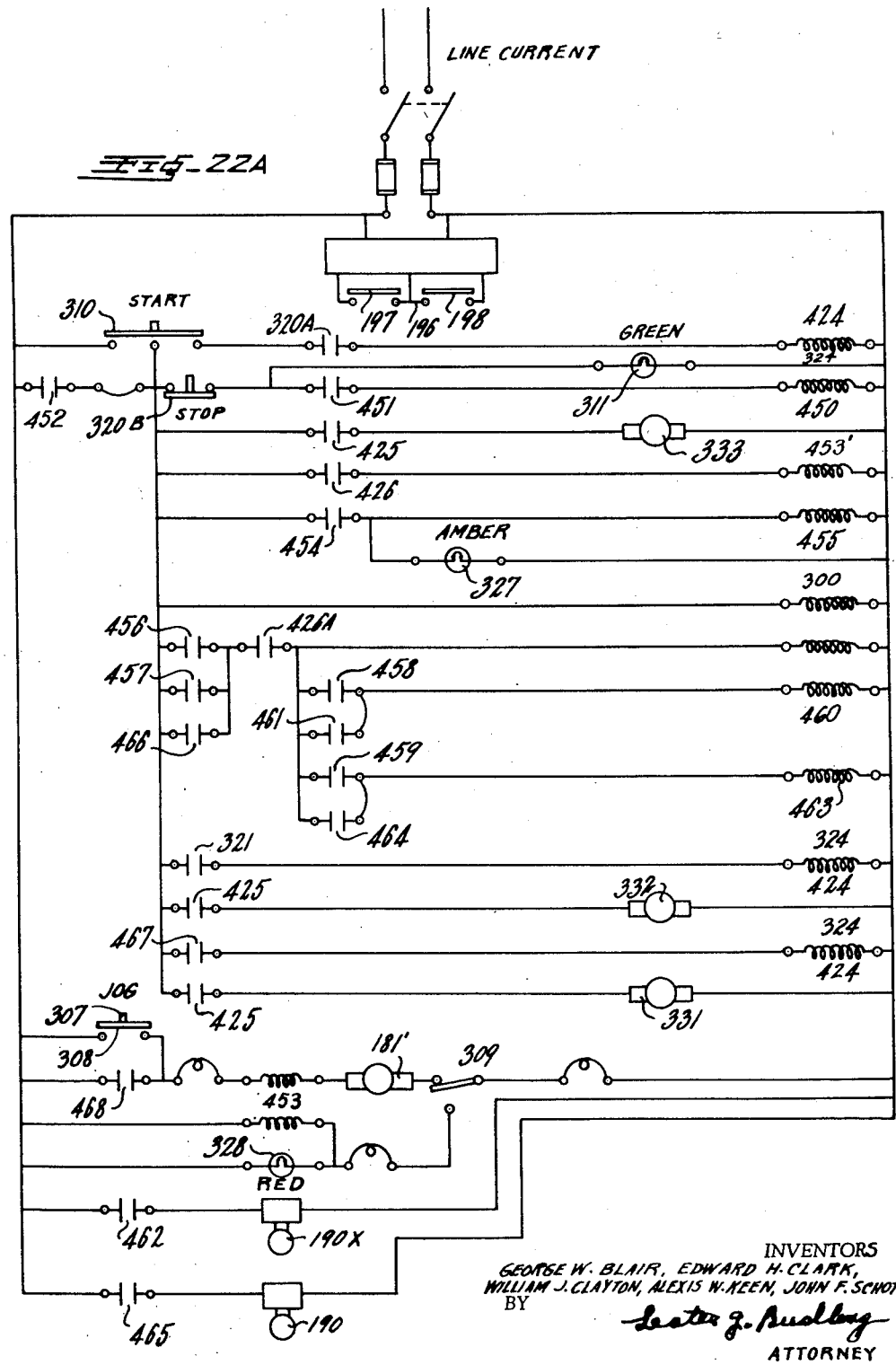

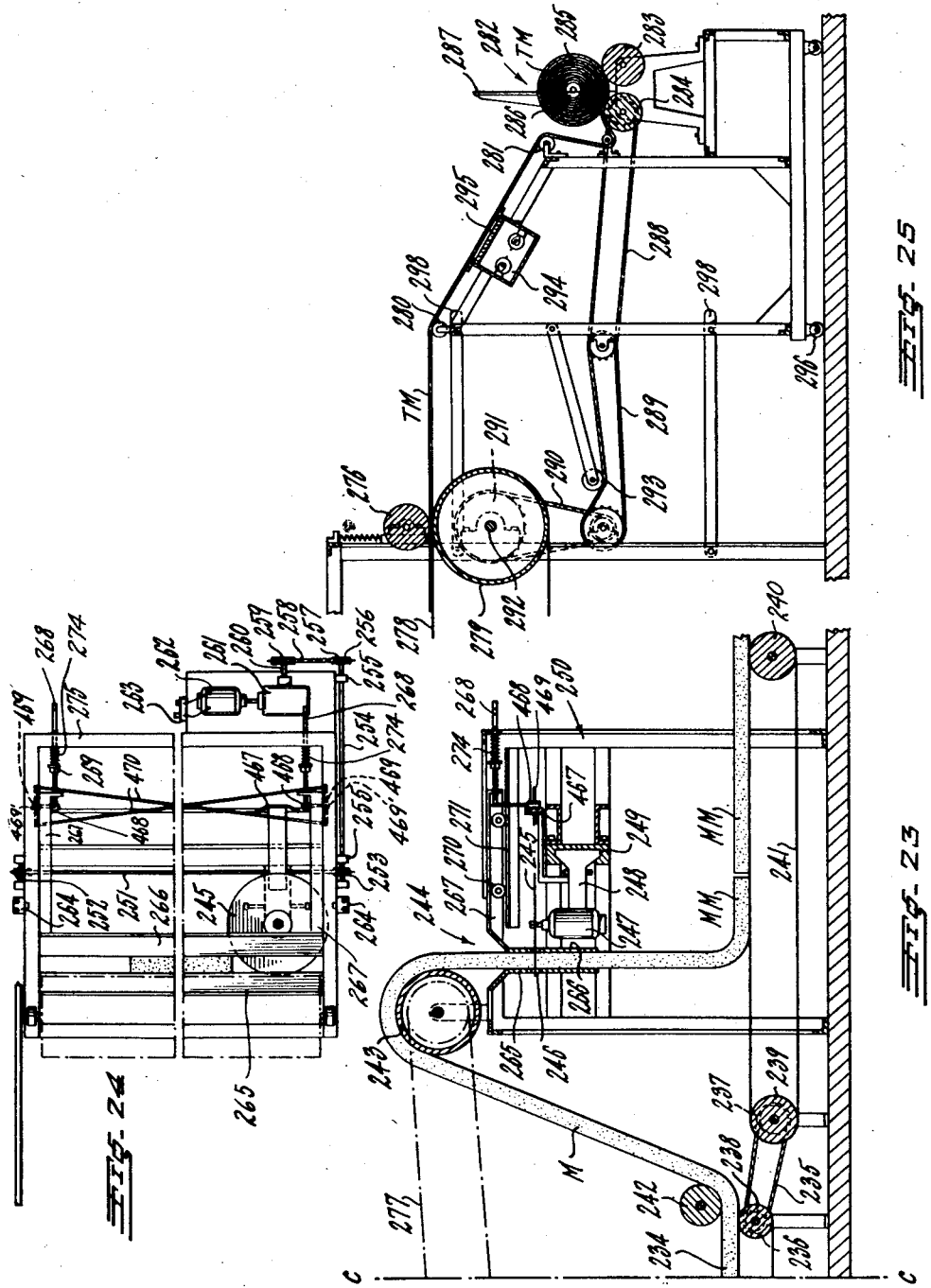

Patented May 11, 1948

2,441,235

UNITED STATES PATENT OFFICE 2,441,235

APPARATUS FOR MAKING SPONGE RUBBER ARTICLES

George W. Blair, William J. Clayton, Edward H. Clark, and John F. Schott, Mishawaka, Ind., and Alexis W. Keen, Packanack Lake, N. J., assignors to United States Rubber Company, New York, N. Y., a corporation of New Jersey Application October 8, 1941, Serial No. 414,082

14 Claims. (Cl. 18—4)

This invention relates to the fabrication of articles from various materials capable of being set by heat, and/or chemicals, into solid form, and more particularly to the manufacture of sponge rubber from foamed or frothed latex, the primary purpose of the present invention being to provide apparatus for the manufacture of sponge rubber in the form of a continuously advancing sheet of the desired thickness.

An object of the present invention is to effectuate such production of sponge rubber on a large commercial scale; for example to produce automobile cushions of a scale commensurate with the rate of production in the automobile industry, and likewise to effect commercial production of other articles, such as mattresses, for example, and various kinds of rubber foam sheet stock of various thicknesses to be embodied in articles having many uses.

The processing steps involved in the continuous manufacture of a sponge rubber sheet in accordance with the present invention contemplates, generally, the substantially continuous deposit, on a suitable moving surface, of latex foam from a supply thereof, the steps of spreading and setting the latex foam so deposited under suitable confinement on said moving surface to form a substantially continuous sheet rubber stock, under desirably low temperature conditions, the step of feeding said articles, or stock, preferably in a continuous progression automatically to a secondary stage of treatment in the apparatus, and while in motion therethrough performing the steps of vulcanizing the stock and separating the product into suitable units for accumulation and sale, or for further fabrication into marketable articles.

The invention consists also in the combination with a frother constructed and arranged to deliver automatically regulated quantities of latex froth or foam in a substantially continuous manner, of a set of moving surfaces, with confining means designed to receive said supply of foam from the frother and to carry out the foregoing subsequent steps with but little manual intervention.

Ancillary objects of the invention include the provision of a main endless belt as the moving surface to receive and transfer the supply of latex foam; lateral metal belts supported adjustably at each side of the main belt and arranged to track with said main belt to confine the foam thereon; a dam around the latex foam deposit zone to confine the lateral flow of the foam preparatory to engagement thereof with the metal belts; and a series of spreading knives readily removable and replaceable for servicing.

Among other objects of the invention is the provision of a battery of churns with automatic weighing devices in combination with control circuits whereby the supply of latex in regulated quantities of predetermined weight to a suitable foaming cell is effected automatically, the churns of said battery being interchangeable to provide for a substantially continuous supply of the latex.

A further object is to provide mechanism for producing in said foaming cell a continuous supply of homogeneous, fine-bubble-size latex foam, and for delivering the same to a mixer to which a sensitizing medium is added to the latex foam in minute quantities of accurate dosage and in which mixer provision is made of novel stirring and scraping means to accomplish uniform and thorough admixture of the sensitizing ingredient free from any premature setting of any portion of the foam about to be discharged upon the main belt.

Still another object of the invention is to provide means for supplying to an elongated oven or enclosure in which the moving belt carries the sheet of foam, a suitable supply of heated air, and novel means by which the current of air, preferably drawn in near one end of the oven, is subjected to a countercurrent within the oven, created by withdrawing from the main current a portion which is blown back along the oven by suitable means for the intended purpose, thereby conserving the heat and enhancing the circulatory effect, while minimizing the bleeding effect which is characteristic of plenum systems.

A further object of the invention is to provide, in combination with the mechanism above described for pouring, setting and vulcanizing a stream of latex foam, suitable means for stripping the continuous sheet of vulcanized, or partly vulcanized product from the belt at the delivery end of the apparatus, and to provide, in association with the aforesaid apparatus, a system of conveyors, extending under the above described apparatus toward the feed end of the same and then back to the discharge end, where provision is made of means to sever desired portions from the continuous sheet after the same has been thus subjected to a desirable prolongation of the heating and drying treatment.

Further objects and features of the invention will appear as the description of the preferred embodiment of the invention, selected for illustration in the accompanying drawings, progresses.

In the drawings, like characters of reference have been applied to corresponding parts throughout the several views which make up the drawings, in which:

Fig. 1 is a view in longitudinal sectional elevation of part of a continuous spreading apparatus in the construction of which the present invention has been embodied;

Fig. 2 is a similar view of an adjoining part of the apparatus as shown in Fig. 1, being designed to be observed in conjunction with Fig. 1 when assembled along the line A—A of said figures respectively.

Fig. 3 is a similar view of a third part to be adjoined with Fig. 2 along the line B—B of Figs. 2 and 3 respectively;

Fig. 3A is a fragmentary plan view showing part of the conveying means in the drier, and its support;

Figs. 4, 5 and 6 are respectively views in plan of the apparatus parts shown in Figs. 1, 2 and 3 severally, the respective lines of assembly being designated A—A and B—B respectively;

Fig. 7 is a fragmentary detail view in transverse vertical section taken on the line 7—7 of Fig. 1;

Fig. 10 is a fragmentary detail view in vertical transverse section taken on the line 10—10 of Fig. 2, upon a larger scale;

Fig. 11 is a view like Fig. 10 taken on the line 11—11 of Fig. 2;

Figure 9:
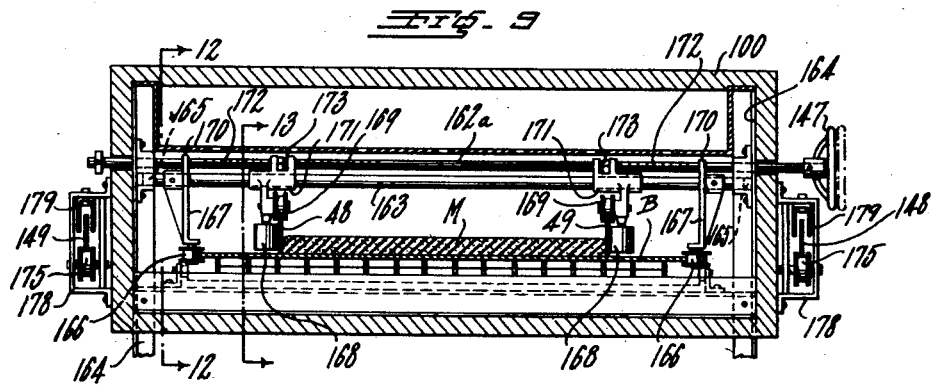
Fig. 9 is a view similar to Fig. 8 taken in vertical section on the line 9—9 of Fig. 1.
Figures 12, 13:
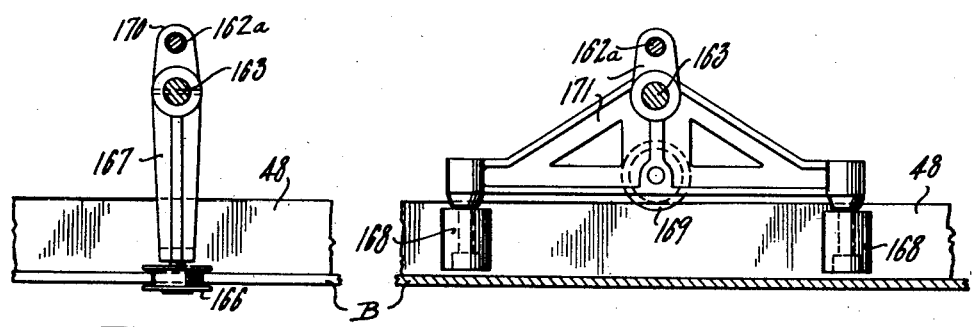

Figs. 12 and 13 are fragmentary detail views in vertical section, taken respectively on the lines 12—12 and 13—13 of Fig. 9;

Fig. 14 is a view in front elevation of a scale which forms part of the mechanism for feeding latex in regulated quantities, the same being shown in plan on a smaller scale at the left hand end of Fig. 4;

Fig. 15 is a view in rear elevation of the scale shown in Fig. 14;

Fig. 15A is a fragmentary detail view in elevation of an electrical control device forming part of the scale shown in Fig. 15;

Fig. 16 is a fragmentary detail view in plan of the prefrother unit and the mixing tub associated therewith, these elements receiving the latex, mixing it with air, and eventually delivering it upon the main belt, as shown in Figs. 1, 4, etc.;

Fig. 17 is a detail view in elevation, partly in section, of the foam cell shown in Fig. 16;

Fig. 18 is a similar view of the stirring unit shown in Fig. 16, with the stirring means indicated in dash lines;

Fig. 19 is a view in reverse plan of the gate shown beneath the stirring unit in Fig. 18;

Fig. 20 is a flow sheet illustrating in diagrammatic fashion the system of piping for supplying under control the latex and air to the various instrumentalities of the latex feed;

Fig. 21 is a diagram of the electric circuits utilized in effecting automatic and manual control of certain instrumentalities of the machine;

Fig. 22 is a diagram of the principal operating circuits, including motors, switches and other associated parts;

Fig. 22A is a further diagrammatic layout of the churn-controlling circuits;

Fig. 23 is a view in vertical section similar to Figs. 1, 2 and 3, illustrating the mechanism for cutting off parts of the final product, and this figure, to be accurately understood, should be observed in connection with Fig. 3, to which it should be adjoined on the line C—C, common to both figures;

Fig. 24 is a detail view in plan of the mechanism shown in Fig. 23 for cutting off parts of the final product;

Fig. 25 is a view in longitudinal section, similar to Fig. 23, of a modification of the mechanism shown in Fig. 23.

Referring now to the drawings in detail, and considering the embodiment of the invention therein illustrated in its generic aspect, with particular reference to the continuous, semi-automatic production of vulcanized rubber articles from a substantially constant supply of latex foam, the latex component, in the form of a suitable liquid dispersion preferably, is introduced from a suitable source thereof indicated by pipes 26 (Fig. 1) to a battery of churns, 27, 28 and thence is elevated, as by pressure from any suitable source as indicated at 29, through pipes designated generally by the reference character 30, through strainers 31, if desired, to the inlet side of a foaming or prefrothing cell 32, in which the foamable liquid latex is admixed in suitable fashion with air, which is derived by a pipe 33 from an air washer and heater system which preferably includes a tank 34 containing caustic soda, and a tank 35 containing hot water.

The liquid latex and air, having been first commingled, constitute a relatively coarse foam, which is then brought to fine, homogeneous bubble size in the foaming cell 32 which may be of any suitable construction, a preferred form thereof being described herein more at length, the same following the general construction and arrangement of what is known as the Keen Prefrother, which forms the subject matter of Alexis W. Keen Patents Nos. 2,295,740, issued September 15, 1942, and 2,335,339, issued November 30, 1943.

To this fine-bubble-size foam, delivered at a constant rate through a spout 36, suitable sensitizing ingredients may be added, as in a mixing tank 37, from which the foam is delivered, as at 38, into the range of action of the spreading apparatus proper, descending upon an upwardly inclined portion 39 of a moving surface which, in the instance illustrated, takes the form of a main endless belt B, that runs over pulley 39' to a driving pulley 40 (Fig. 3) at the other end of the run of the belt, from which the return portion 42 is carried back on idler pulleys 43, then around a belt-tightener system of pulleys 44 (Fig. 1), and rotary cleaning brushes 45, to the pulley 41.

Above the portion 39 of the belt, at the loading end, a pool 45' of the foam is formed, being confined by a dam 46, and as the belt advances, a stream of latex foam is fed with the belt, passing at the region 47' into a broad gateway between convergent parts of a pair of upright deckle belts 48, 49 (Fig. 4), the paths of which are defined by systems of driving and direction pulleys 50, 51, 52 and 53 (Figs. 4 and 5), the pulleys 50 have driving means, designated generally by the reference characters 55, and the pulleys 52 can be adjusted to vary the width of the strip of foam by the devices 54.

In the instance illustrated, the pulleys 50 are driven by worm wheels 56 meshing with worms 57 on a countershaft 58, which, in turn, is driven by a link belt 59 and short-shaft 60, the latter being driven, through bevel gears 61, by a shaft 62, the latter running lengthwise of the apparatus from a reduction gear box 63, driven by a chain 64 from the main driving motor 65. The gear box 63 is also connected by a shaft 66, gear box 67 and chain 68 to drive a sprocket wheel 69 on the main shaft 70 of the roll 40 which actuates the feed belt B, and thus the drive of the belt 36 and deckle belts 48, 49 are synchronized.

The speed of the motor 65 is controlled normally at a suitable speed control box or the like R at the main switchboard (see Fig. 22) and, when the speed is thus changed, corresponding changes in the speed of operation of the above instrumentalities are effected together with the speed of other instrumentalities, designed to be operated in predetermined time relation, as will be pointed out hereinafter.

The roll shown at 71 in Figs. 3 and 6 at the output end of the machine is a stripper roll, over which the advancing partially vulcanized mat 72 of sponge rubber is elevated, away from the belt B, and is then led back upon the belt as it passes through the bite of roll 40 and an idler pressure roll 73 (see Fig. 3).

Suitable means are provided to control the thickness of the spread of latex foam as it passes from the pool 45', and as an improved construction for this purpose, the drawing illustrates spreading devices 74, 75 (Fig. 1), which will hereinafter be designated "knives" for the sake of brevity, without technical limitation, the term being so understood by those skilled in the art.

Figure 8A:
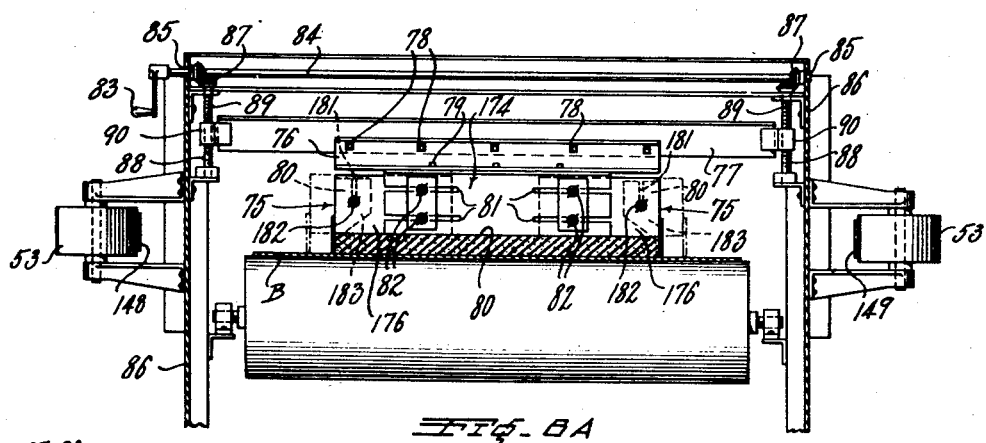
Fig. 8A is a fragmentary detail view in transverse vertical section of a modification of the structure shown in Fig. 8.
Figure 8:
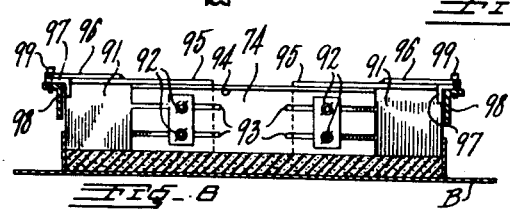
Fig. 8 is a similar view taken on the line 8—8 of Fig. 1.

These knives appear in Fig. 1 in vertical section, and one of them is illustrated in more detail in front elevation in Fig. 8, where the knife 74 is shown as having slidably adjustable wing sections 91 secured adjustably to the middle section 74 by bolts 92 extending through horizontal slots 93 therein, the mid section and wing sections having also top flanges 94 and 95 which serve to maintain them in alignment. To each of the top flanges 95 is welded a plate 96 to which in turn is welded an angle piece 97, and this part of the wing structure rests upon a frame part 98 to which it can be secured by a bolt 99.

Fig. 7 shows both the frame parts 98 as mounted upon the cross-head structure which serves to determine the width of the space between the deckle belts 48—49 and therefore the breadth of the latex stream M, and thus the width of the knives is regulated automatically in correspondence with the breadth of the latex foam sheet.

In the modification shown in Fig. 8A, the knife 174 is shown as having slidably adjustable wing sections 176 depending from a bracket 76 secured to a cross-head 77 by bolts 78. Each knife comprises a central portion 174 secured by bolts 82 to the bracket 76, and the knife is horizontally slotted at 81 to receive clamping bolts 82 carried by the slidable end pieces 176 which also constitute end portions of the knife structure.

Adjustments can thus be made to vary the width of the knife-spread, and the height of its lower edge 80 above the belt at the region of their operative contact with the mat of foam to be spread.

The knives can be removed readily and replaced, when they need to be cleaned, by loosening the bolts 78, and the set of knives can be raised and lowered bodily by turning a crank 83 at the front side of the machine, thus rotating a cross-shaft 84 having bearings 85 in the frame uprights 86, to rotate bevel gears 87 at each side of the machine, and thereby actuate other bevel gears on vertical shafts 88 by which the lead-screws 89, engaged with suitably threaded blocks 90 on the cross-head 77, cause the latter to be raised or lowered bodily, with its set of knives.

Provision is desirably made of corner plates 183, secured to each of the wing sections 176, as by bolts 182 in vertical slots 181, the purpose of these plates being to "scrape" the upper outer margins of the sheet of foam M before it has set, and thus to obviate the tendency normally exhibited by the margins in such a stream of foam to creep above the general level of the stream of foam.

In Fig. 7 is illustrated in transverse sectional elevation a preferred form of means for effecting the adjustment of the idler pulleys 52 to vary the spacing between the deckle belts 48, 49, and between the wings 46a of the dam which are carried by the rails 98.

Each of the idlers 52 is shown as journalled on an upright shaft 155 carried by a slide 54', on which is also mounted one of the rails 98. Through a threaded block 156 on each of the slides 54' is extended a lead screw 157 having right and left threaded portions working in the blocks. Each lead screw has an unthreaded portion 158 running freely through an abutment 159 mounted on the cross-head 160, and provided with collars 161 which are fixed relatively to the lead screws.

Upon applying a suitable tool to either of the square ends 162 of the lead-screw and rotating the same, the slides 54' and their associated parts are caused to approach or recede from each other at will, thus effecting the desired adjustments of the deckle belts, etc. relatively to the working length B of the main endless belt.

We have also made provision for holding the main belt B and deckle belts 48 and 49 up to their work at one or more positions along the length of the path of the sheet of foam under treatment, and a now-preferred form of attachment for this purpose is shown in detail in Figs. 9, 12 and 13. It comprises a cross-rod 163 extending into sockets carried by frame uprights 164, the length of the rod being such as to permit a slight end-shake in the sockets, as indicated in dotted lines at 165 in Fig. 9.

This occurs under the action of occasional lateral irregularities in the longitudinal marginal edges of the belt, or when slight weaving of the belt occurs for any reason, and at such times said edges press laterally against rollers 166, mounted on brackets 167 depending from the rod 163, to which the brackets are pinned, the rollers 166 acting at all times as guides.

The rod 163 acts also to support sliding brackets 171 each of which is provided with one of the smooth faced guide rollers 168 mounted to rotate freely on a short vertical shaft carried by the bracket, and one of the grooved guide rollers 169 mounted to rotate freely on a horizontal stud thereon.

Each bracket 171 has an upright yoke formation 170 which forks a threaded portion 172 of the lead screw 162a, the fork provides a space in which one of the two nuts 173 is mounted so that it cannot rotate with the lead screw but has a slight movement with the lead screw 162a when the latter is caused to move endwise, as for example from the full line position of the hand wheel 147 at the right-hand end of Fig. 9, to the dot and dash position thereof, such end-shake being caused by lateral movements of the belt B which carries with it the deckle belts 48, 49 and their associated parts.

By turning the hand wheel manually, the brackets 171 and their associated parts may be caused to approach to each other, and to recede, at will, in conformity with adjustive movements induced by the crank 83 in Fig. 8, as already described.

Upon reference to Fig. 13, it will be seen that each of the brackets 171 is provided with two of the smooth-faced cylindrical guide-rollers 168, spaced apart from each other and thus aiding to avoid wavy movements of the deckle belts 48 and 49.

The return portions 148 and 149, of the deckle belts respectively are guided by grooved rollers 175 suitably journalled in brackets 178, and are held against waving, by the forks 179, which also limit undue tendency of the said return portions to rise.

This mechanism is enclosed by the oven 100.

As the sheet M of latex foam is advanced by the main and deckle belts, it is subjected to heat treatment of the desired character, as within an oven 100, into which the heated air is introduced through distributor ducts 101 having outlet ports 102, through which, as indicated by downward extending arrows 103, the duct supplies to the oven 100 air which derives its heat from a suitable source thereof 104 disposed in a heater 105, the heat being supplied in the instance illustrated, by a system of steam pipes 106. (See Fig. 5.)

The heated air forced into the oven 100 through the outlet ports 102 maintains therein a plenum, and flows along the oven with the sheet M, effecting thereon a setting action which results in imparting to the sheet a set condition which permits withdrawal from the sheet of the support derived from the deckle belts, and the latter accordingly are turned back around the pulleys 50 in the vicinity of the heater 105, as already described.

The heated air is recirculated by means of a blower 107, operated by a motor 108 in the manner indicated in Fig. 5, the heater unit having an intake at 109 and a delivery port at 110. Such systems are well-known to those skilled in the art, and further description is not deemed necessary. The heater unit shown at 111 may desirably be a replica of that designated 105, and similar parts are correspondingly lettered.

We have found that in the operation of a circulatory system for the intended purpose, where replacement of a certain amount of air at the output end of the machine is requisite to maintain the system effective, there is a tendency to create a draft of too great velocity and volume back in a direction contrary to the line of progress of the sheet M, lowering its temperature and interfering otherwise with regularity of the heat treatment.

In order to obviate this effect, we have provided a novel expedient for setting up a countercurrent of air, as indicated by the arrows 112 in Fig. 2, in order to counteract the inward flow. This we accomplish by drawing in a certain amount of air at 113, see Fig. 5, by means of a fan driven by the motor 114, the air being taken from the oven through a port 115, and being returned thereto through a port 116, in reverse direction, thus accomplishing the desired effect without reducing the temperature of the air within the oven 100.

At the delivery end of the oven 100, provision is made, according to the invention, for a further drying treatment of the sheet M, preliminary to its severance into parts of desired size, and such treatment may vary considerably in character.

In Figs. 2, 3, 3A, 11 and 23 we have shown one structure by which the treatment of the sheet M may be prolonged in the desired manner, the space below the return sheet of the main belt B being utilized for this purpose as follows:

At 200 is provided a drying enclosure, divided by a substantially horizontal partition 201 into an upper compartment 202 and a lower compartment 203, heated air being blown into the lower compartment 203 and being exhausted from the upper compartment 202, by means of a blower 204 and an exhaust fan 205 (see Fig. 3) the heating being effected at 206. A certain amount of moist air is diverted at 207 and discharged from the system, and increments of fresh air are drawn in at 208 and added to the used air received by blower 204 from exhaust 205 through the coupling duct 209. Regulating dampers are provided at the points indicated at 210 and 211 to enable the ratio of fresh air to used air to be controlled.

An endless inbound conveyor belt 212 is provided in the upper compartment, and an outbound endless conveyor belt 213 in the lower compartment.

These conveyor belts are preferably of the woven wire type illustrated at 214 in Fig. 3A, and are driven by rolls 215, 216, the former of which is actuated by a chain 217 running from a sprocket wheel 218 on the shaft on which the main drive pulley for the belt B is mounted, thus synchronizing the belts. The conveyors 212, 213 are preferably run at the same speed as the primary conveyor B, and to provide for the proper direction of movement as between conveyors 212 and 213, gearing is shown at 219—220, a chain 221 driving the gear 219, while a similar chain 222 runs from a sprocket wheel 223 on the shaft of gear 220 to a sprocket wheel 224 on the shaft of roll 216.

It is to be noted that the currents of heated air proceed at all times in a direction opposite to the direction in which the sheet M is being fed, according to approved practice in this art.

The sheet M is led through an opening 230 to the upper run 212 of the conveyor in the upper compartment 202 of the drying enclosure, and is carried on said conveyor to the other end of the enclosure, passes thereover idler pulleys 225 and 226, and is laid on the upper run 227 of conveyor 213, by which it is carried back to the rear end of the apparatus and discharged through an opening 228 in the end wall 229 thereof for further disposition.

The drying enclosure 200 may be of any suitable length, and in the instance illustrated extends to a region under the heater 105, a distance of say 75 feet, thus nearly doubling the length of treatment in the apparatus.

Supporting idlers 231 are provided where needed, and the outbound end of the sheet M may be received on a suitable conveyor 232 exterior to the dryer and carried to a point 234 as shown in Fig. 23. This external conveyor 232 is actuated by a chain 235 running between sprocket wheels 236 and 237 on the shafts of rolls 238 and

239. The last-named is driven by another sprocket wheel and chain running from a source of power (not shown) but timed in synchronism with the instrumentalities already described. Running between the roll 239 and a pulley 240 spaced at a suitable distance therefrom is an endless conveyor belt 241 constructed and arranged to receive the parts MM severed from the sheet M in any suitable manner, as by the severing mechanism now to be described.

The sheet M is led under a guide idler 242 and upward over a drive guide 243 and thence traverses in a downward direction a vertical throat 244 by which the sheet is held straight. As it passes through the throat, the sheet M is severed by a high-speed cutter disc 245 working in a horizontal slot 246 of the throat. To rotate the cutter disc, it is fixed upon the vertical shaft of an electric motor 247 supported by an arm 248 having a dovetailed end fitted in a similarly shaped guideway 249 extending across the frame 250 parallel with the breadth of the throat 244.

The cutter head is moved bodily from side to side of the frame 250 by means of an endless chain 251 which runs around an idler pulley 252 at the off side of the frame (see Fig. 24) and runs around a sprocket wheel 253 fixed upon a shaft 254 extending in bearings 255 rearward to the point illustrated at 256, where it has a sprocket wheel 257 engaged by a chain 258 that runs to a sprocket wheel 259 upon a shaft 260 from a reduction gear box 261, the gears in which are driven by a reversible synchronous motor 262, connected by conductors running to a suitable switch 263. By means of limit switches 264 of known type and usual operation, the direction of the current in the windings (not shown) of motor 262 is changed whenever a part of the cutter head is engaged with one of the limit switches 264, so that the cutter-head is constantly making the required travel to and fro, severing a part MM of the sheet M at each such traverse.

Preferably, the throat has a fixed jaw 265 and a movable jaw 266 between which the sheet M is clamped while it is being cut, the latter being provided at each of its ends with a slide 267 having wheels 270 running on the tracks 271. The movable jaw 266 is operated by a cam 467, carried by the arm 248.

As the circular knife 245 moves from one side of the frame 275, the cam 467 is brought into engagement with one of the oppositely disposed vertical rollers 468 which move the jaw 266 away from the sheet M.

These rollers are carried on T-shaped elements 469 pivoted at 469' on opposite sides of the slide 267 and are connected together by cross-rods 470 to give reverse movements of the movable jaw. The shock accompanying rearward movement of the slides on carriages 267 is taken up at each side by plungers 268 having collars 269 fixed on the plungers and adapted to engage coil springs 274, interposed between the collars and the frame member 275.

When the movable jaw 266 is retracted, the severed piece MM occupying an upright position in Fig. 23 is free to leave the throat readily and descend upon the conveyor for inspection and further disposition.

The throat is then ready to have a fresh length of the sheet M fed thereinto by the roll 243 which is driven by a sprocket chain 277 connected to operate in timed relation with the other instrumentalities of the apparatus.

In place of a severing mechanism, such as that illustrated in Figs. 23 and 24, just described, there may be substituted mechanism, such as that shown in Fig. 25, designed to facilitate inspection and accumulation of the sheet material after it leaves the drier.

In the mechanism of Fig. 25, an endless belt conveyor 278, running over a roll 279, delivers a sheet TM of the treated material between the belt 278 and a pressure roll 276, over guide rolls 280 and 281 to a known form of accumulating device 282 comprising an idler roll 283 and a driven roll 284, between which rests the growing roll 285 of stock TM, which may be wound on a spindle 286 to any convenient dimensions. The ends of the spindle 286 are engaged loosely with a pair of upright guides 287 which resist the pull of the stock tending to unseat the stock roll 285 as it increases in diameter.

The driven roll 284 is actuated by a system of chains 288, 289, and 290 running from a sprocket wheel 291 on the shaft 292 of the conveyor chain pulley 279. A gravity-biased idler 293 takes up slack in the chain 289. For purposes of ready inspection, provision is made of a light-box 294 fitted with a glass plate 295 through which light is transmitted to the under side of the sheet TM as it passes thereover.

The part of the frame carrying the stock roll 285 and its associated parts is mounted on castors 296 and is readily detachable from the rest of the frame, for which purpose the bars 298 are shown as taking the form of latches.

With such provision it is feasible to remove one roll of stock with its carriage, and substitute another carriage ready to receive another roll of stock at will.

Having given above an outline of the nature and operation of the several instrumentalities which make up the apparatus of the present invention, with especial reference to their combinative relationship, a more detailed description will now be given of certain of these instrumentalities, and the following is a description of the construction and operation of the mechanism which mixes the compounding ingredients into the latex and controls its feeding automatically to the belt of the spreader. As already indicated, provision is made of a battery of churns 27, 28, but at first we will consider one churn only, since the two are identical in their operation and are used interchangeably, being connected in multiple to the feed pipe 30 which supplies the prefrother. While one churn is being used, the other may be reloaded. As shown in Fig. 4, each churn is mounted on a weighing mechanism or scale of lever type, the scales being designated respectively S and SS, and the scale S being shown separately in Figs. 14 and 15. Each scale is provided with two beams, viz., a double beam 177 and a threaded beam 182', carried by a lever extending into the standard of the scale. The interior mechanism is of conventional character, unless otherwise described. A motor 181' rotates the threaded beam 182'. A tare rider 180 is moved along the threaded beam 182' by rotation of the latter.

In setting up the churn for a run of latex, the procedure is as follows:

1. Push the motor-driven tare rider 180 from its position as seen in Fig. 14, to zero point on the threaded beam. This can be done after releasing the catch 183' on the rider.

2. Put in the latex through the supply pipe 26, say 700 lbs., for example. Weigh this in on the lower tare beam 184 of the double beam 177. This is an ordinary weighing operation.

3. Pour in, say 100 lbs. of compounding materials, through opening 185 at top of churn, at which time the pointer 186 will indicate 100 on the dial 187.

4. Set up 100 lbs. more on the scale 184 to bring the pointer 186 back to zero on its dial 187. (Final adjustment is made later.)

5. Close plate 188 on the opening 185 to seal the churn.

6. Weights 189 are added to tare beam rider 180 to predetermine the rate of flow of latex in lbs. per hour at the prefrother 32. The rider 180 takes up to 60 minutes to travel along the threaded beam 182′, and its function is to compensate for the diminution in weight of the latex as consumed, by moving further out along the beam as the latex is forced from the churn by air pressure, at the predetermined rate of flow.

7. Air from the air line 29 is forced into the churn pipe 191, under 6 to 8 lbs. pressure through the pressure control valve 190. Valve 190X is a bleeding valve to be described. Pressure gages 193 are provided to indicate the air pressure.

8. The top beam weight 195 is next set to bring the pointer 186 close to the zero point on its dial 187.

A by-pass pipe 29A (Fig. 1) is provided through which the air may be applied to raise, in the system, latex from the churn in use initially prior to switching over to the solenoid valves 190 and 190X which thereafter control automatically the introduction and exit of air.

It is now to be noted that as long as the rate of consumption of latex from the churn corresponds to the rate of travel of the tare-rider 180 on the threaded beam 182′, the pointer 186 will not change its position. As shown in Fig. 15, attached to the arbor of the pointer 186 is an arm 196 which moves with the pointer, and if there is any discrepancy between the rate of movement of the tare-rider 180 (which movement is constant) and the withdrawal of latex, which may vary, the pointer 186 and the arm 196 will be simultaneously displaced, and such displacement will be indicated by the angular position on the dial then assumed by the pointer, either to the right or to the left of the zero point.

At the same time the arm 196 will be displaced to the right or to the left of its Fig. 15 position, and these arm movements are used to complete electrical control circuits in which the arm 196 is included as a contact-making member, being grounded to the frame of the scale, these circuits being provided for the purpose of controlling the solenoid valves 190 and 190X, to admit air to the churn or to release it therefrom. Cooperating contact terminals are provided at 197 and 198 on a yoke 199, the contact terminals taking the form of screws with milled heads which can be adjusted manually, and are insulated from each other by the material of the yoke, which is preferably made of an insulating substance. One of the contact terminals 197 is included in a control circuit which is closed by contact of the arm 196 with the screw 197, and the control circuit which includes contact terminal 198 is closed by contact of the arm 196 with the screw 198. These circuits will be described in due course.

As shown in Fig. 15A, the yoke 199 is secured to an armature 299 of an electro-magnet 300 mounted on an angular metallic bracket 301 which in turn is carried by a base-piece 302 of insulating material affixed to a suitable part 303 of the scale structure.

The armature is pivoted at 304 to the bracket, in such fashion that the yoke 199 is gravity-biased to a position indicated by dash-dot lines in Fig. 15A, at which position the contact terminals 197 and 198 rest out of the range of movement of the arm 196, and the control circuits remain open and inoperative. This permits the arm 196 to swing about its pivot without interference at the time of weighing in the latex and compounding ingredients. The yoke is moved to its full-line operative position by the passage through the magnet 300 of an activating current through conductors 305, 306 leading from a circuit to be described.

9. The churn operator will now bring arm 195 to mid-point between the two contacts 197 and 198 by the use of the jog button 307 (see Fig. 21). This button operates a switch 308 for momentarily closing the circuit to the synchronous motor 181′ and the motor rotates lead-screw 182′ to move the rider 180 toward a limit switch 309, by a jogging movement which is used for more accurately adjusting the position of the arm 196 with respect to the contacts 197 and 198. These jogs move the arm 196 only a very little at a time and enable the churn man to make the adjustment more easily and accurately.

10. At this point the churn man signals to another operator who in turn presses starting button 310 (see Fig. 21), which closes the circuit of magnet 300 and swings the yoke 199 and its contact terminals 197 and 198 into place to be in position for contact by the end of the arm 196. This also results in turning on a green light 311 (see Fig. 21), showing that the set up of the churn is complete for this run of latex to the prefrother.

To regulate the flow of the latex within accurate limits, the air pressure is applied to or released from the interior of the churn respectively through the agency of the electrically operated solenoid air valves 190 and 190X (see Fig. 1).

In the event that the flow of latex is too slow, the arm 196 will contact the point 197 causing air valve 190 to be actuated, and allowing the compressed air to be exerted against the top of the latex in the churn. (The feed pipe 30 to the prefrother is connected to the bottom of the churn.) The result of this application of air is an increased flow of latex through the feed pipe.

If this pressure builds up too high, causing too rapid flow of latex to the feedpipe, the arm 196 will contact the point 198, actuating valve 190X, thus releasing air from the churn and reducing the flow of latex. The variation in pressure within the churn is approximately between 5¾ and 6¼ lbs. In other words, it is regulated between these limits and keeps the latex in constant flow and at a substantially uniform weight rate of flow.

In order to regulate the churns for foams of different densities, and heavier or lighter compounding, and also to smooth out the operations of the air valves 190 and 190X there is provided a set of three timers, designated by the numerals 314, 315 and 316 in Fig. 21. This set includes timer 314 which controls the period of time between air applied operations; timer 315 which determines the period of time during which air is applied, and timer 316 which sets the length of time required to run a particular batch of foam from the churn to the prefrother. These timers operate a series of relays 317—322 which receive alternating current under the control of a contact amplifier 323 adapted to keep to a minimum the sparking at the contact points in the control apparatus. A satisfactory amplifier for the above purpose is known on the market as the "type 6A rectifier tube," and is designated 323A in the drawings illustrated. The contact amplifier 323 is controlled by the arm 196 as the latter operates between the two contact points 197 and 198 of the scale.

A typical example of the control through the above timers, occurs when a relatively dense foam, for example, is being run through the machine, and the air pressure in the churn is not sufficient to supply the required weight of foam to the spreader. Under these circumstances, the contact point 197 will be engaged by arm 196 and in turn will actuate amplifier 323 causing the operation of relay 318, closing a circuit which includes timer 315, which may be set for example to act for 15 seconds, allowing current to be supplied to solenoid of air intake valve 190 for that period. At the end of this 15 seconds period a clutch 324 is released in timer 315, allowing a set of contacts 325 to be closed, operating relay 317 to close a circuit which includes solenoid valve 190X, releasing air, thus making timer 314 effective. The timer 314 may be set for example at 5 seconds which is the length of time in which no air is to be released or admitted. At the end of this time if point 197 is still in contact with arm 196, the timer 315 will repeat its cycle, which is the period of 15 sec. of air admission.

If at the end of the above 15 sec. duration (which is the setting of clock dial on timer 315), the air pressure becomes too great, point 198 will be contacted by arm 196 causing amplifier 323 to close relay 317 to energize timer 314 and operate bleed valve 190X. This air bleeding valve 190X will then release air for 15 sec. At the end of this time the circuit is closed in the timer 314, as already described, permitting no air to be admitted or released for the dial set period of 5 sec. (this being the predetermined setting on clock dial of timer 314).

Timer 316 may be set for a maximum of 60 min. run (calibrated in minutes). This timer is for the purpose of timing the batch of latex foam for a specified length of time to complete a job. Suppose the latex foam is to be run for 40 minutes. At the end of this time an amber light 327 (see Fig. 21) will show that the run has been completed, and the tare rider 180 may now be set back to zero position and the churn turned off from the pipe line while the other churn is turned on. If this were not done, the weight would travel along to the end of the beam and cause operation of the limit switch 309, turn on the red light 328, stopping the machine. The churn man can now refill the churn to any amount necessary, putting in the required compounding materials and will reset the weight 180 on the threaded beam to balance the system in accordance with any desired weight rate of flow, or at the same rate as before, depending on the work to be produced. The tare rider 180 moves along the beam in one hour and continuously balances the latex remaining in the churn.

A manual safety valve 330 is used to release air from the churn before taking off the filling cover.

The foregoing electrical apparatus is operated by a single phase 60 cycle alternating current. The timers 314, 315, and 316 are all standard instruments of well known design, and each is controlled by a clock mechanism driven by a single phase motor 331, 332, and 333 according to usual practice.

These timers smooth out the operation of the air admission and release valves 190 and 190X, thus cooperating to act as a governor which prevents operation of the valves in a chattering manner due to excessive contacting of the arm 196 with either of the points 197 and 198. The valve mechanism is therefore saved from unnecessary wear.

The clutch 324 in each timer comprises the usual solenoid 424 operating mechanical means (not shown) for actuating one of the switches 425 or one of the switches 426, as the case may be.

In the timer clocks 314, 315 and 316, provision is made of contacts which are adjustable to vary the times of opening and closing the switches 425 and 426 on each of the timers, to provide for longer or shorter periods of operation of the solenoid air valves 190 and 190X.

The following is a more detailed description of the diagrammatic churn control circuits shown in Figs. 21 and 22A.

When churn is filled and scales brought to zero setting so that the hand 196 is brought between contacts 198 and 197 on contact yoke 199, the start button 310 may be pressed to close clutch 324 of the timer 333 through relay 320A, energizing coil 450 through contact 451, and thence by way of stop button 320B, causing contact 452 to be closed and continuing the circuit after start button 310 has been released. This causes green light 311 to indicate that the machine is in operation. The switch 425 is closed causing synchronous motor, on clock 333 to operate. The switch 426 next closes relay coil 453'. The switch 454 is a time closed switch which is regulated by the usual vernier dial on the face of the clock which latter is adjustable to operate at definite intervals of minutes. After the given lapse of time set by switch 454 is completed, the circuit closing relay 455 causes the amber light 327 to appear, and releases the switches 425 and 426 showing that a predetermined cycle has been completed.

Pressing of the start button 310 causes the above circuits to be energized and continued by the action of the relay contact 452 of the relay 319.

The contact amplifier 323 operates through four microswitches 456, 457, 458 and 459 (see Fig. 22A) which in turn control the admission and release of air through solenoid valves 190 and 190X in accordance with action of the tare weight 180 on the tare beam 182.

After starting the above apparatus as indicated, if the foam from the prefrother has a tendency to lighten the load on the scales, then the contacts 196 and 198 will touch. This in turn will close micro-switches 457 and 458, sending current through switch 426A of timer 314, energizing coil 460, and this circuit is held by contacts 461 until the switch 426A on the timer 314 opens. As coil 460 is closed, contacts 462 are also closed completing a circuit to solenoid air valve 190X releasing air from the churn 27.

When contact points 196 and 197 are in contact, the microswitches 456 and 459 associated with the coil 463 and contacts 464 and 465 complete a circuit to solenoid release 466 of the relay 321.

The relays 317 and 318 are yoked together with a mechanical interlock so that one cannot be energized at the same time as the other.

After a set length of time the contacts 467 of timer 315 are closed energizing clutch 324 in timer 314. This causes contacts 425 of timer 314 to be closed, and starts synchronous clock motor 331. The contacts 426A set the lapse of time for no increase of air, or to release air from the churn.

The synchronous tare motor 181' which is set for accuracy by jog button 307, before start button 310 is pressed, causes the contacts 468 to be closed. At the same time the contacts 452 are closed, continuing operating of the tare motor 181' through the circuit to the limit switch 309, until a set time is reached, or until the tare rider strikes the limit switch 309 after the motor has been running 60 minutes. After the tare motor circuit has been broken, the coil 453 is energized, causing coil 450 to be de-energized and move contacts 197 and 198 out of range of the arm 196 until the start button 310 is pushed again at the beginning of a new run. The operation of the coil 453 also causes the red light 328 to appear, indicating the completion of this particular run of latex to the spreader.

*Main drive of spreader*

The spreader belt and the cleaning brushes are operated from a three phase 60 cycle line. (See Fig. 22.)

The three phase bus 334 extends the length of the machine (see Fig. 22), and is controlled through a main line switch 335. The induction motors 65 and 336—338 which drive the belt and the cleaning brushes are connected and disconnected from the bus by individual starter relays 339—342 under the control of sets of start and stop push buttons 343 and 344 at opposite ends of the machine, permitting control at both ends of the machine. Each of these sets consists of a start button and a stop button which are so identified in the drawings by appropriate legends, and are connected in the wiring system to turn all of the motors on or off simultaneously from either end of the machine.

Certain of the instrumentalities making up our improved apparatus are, as already indicated, independent inventions, and form the subject of appropriate applications filed by the inventors thereof, so that they are considered herein from the viewpoint of their combinative relationship to the other instrumentalities, and are only described to such an extent as to enable their operation to be understood, not forming the subject of claims herein as to structural details.

With the above reservation in mind, and referring first to the foaming cell 32 already mentioned, Figs. 16 and 17 show how this foaming cell operates. It comprises a rotor having an upright shaft 400 on which are mounted at suitable distances apart coaxially disposed discs 401, the shaft being rotated by a motor 402 operating through a belt 403 running to a pulley 404 (see Fig. 16), the motor being shown as mounted upon the top 405 (Fig. 16) of a cylinder 406 (Fig. 17) provided with a jacket 407 in which may be circulated through conduits 408 and 409 fluids at the proper temperature to condition the operations in the cylinder. From the inner wall of the cylinder, stator members of disc form 410 extend into the horizontal spaces between the rotor discs 401, the clearance between the faces of the rotors and adjacent stators being such as to exercise opposed shearing forces tending to reduce the bubble size of the foam to a uniformly fine bubble size. The spaces between discs may range from 0 inch to one-half the distance between the stators. In the existing equipment the space between the stators is 1¼ inches. To move the rotor more than one-half way would be to approach the other stator, thus reducing the space again between the rotor and stator.

The stators are provided with central apertures 505 through which the foam may travel upward in a tortuous path.

The latex from conduit 30 is introduced through a nozzle 411 into a mixing chamber 412, to which air from the conduit 33 is supplied through a multiplicity of small nozzles 413, extending upward through the bottom 414 of the chamber 412. The latex foam is discharged continuously at a uniform rate by a spout 36 to the mixing tub 37.

The latter may be of any suitable construction, and is herein illustrated as following approximately the structure of the mixing apparatus illustrated, described and claimed in Clark's Patent 2,316,562, issued April 13, 1943.

Mixers of this sort are provided with a rotating tank or tub 37 in which is disposed a whip or stirring device 415, preferably of the cage type. A scraper 416 pressed yieldingly toward the inner wall 417 of the tank by a spring-biased lever device 418, acts to remove the latex mix 419 from the vicinity of the inner wall to a position where it will be acted upon by the stirrer. Thus any tendency of the latex foam to coagulate is averted, and a thorough admixture of the latex foam and the sensitizing ingredient is accomplished. The sensitizing ingredient is supplied to the tub by suitable means which takes, in the instance illustrated, the form of a brace of feed pumps 420 of identical structure discharging through spouts 421.

The foam is discharged from a gateway 422 at the bottom of the tub, as shown in Figs. 18 and 19, and the discharge is controlled by a gate valve 423 pivoted at 434, being carried by a radial arm 435.

A similar oppositely disposed arm 436 is adapted to be engaged with the keeper 427, which exerts on the arm a camming action tending to close the gate against its seat, as shown in the full line position in Fig. 19.

For operating the valve 423 provision is made of a wheel or circular hand grip 428 attached at opposite ends of the radial arms 435 and 436, whereby the operator may grasp the wheel 428 from any side thereof while the tub is rotating, and he will then swing the wheel and gate to the dash-dot line position.

At 429 idler rolls are shown on which the bottom flange 430 can run freely during rotation of the tub by motor 431.

In Fig. 5, brushes 500 are shown, mounted in position to clean the deckle belts 48 and 49, the brushes being operated by motors 337 and 338. The brushes 45 for cleaning the main conveyor belt B are driven by a motor 336.

Having thus described our invention, what we claim and desire to protect by Letters Patent is:

1. In an apparatus for producing articles of the class described from latex foam or the like adapted to be set into solid form, a foam cell constructed and arranged to generate a homogeneous fine bubble size foam from supplies of liquid latex and of a gaseous element, in predetermined quantities of each, said apparatus comprising means to introduce said gaseous element to the cell in the prescribed quantity, and mechanism to introduce concurrently to said cell a foamable liquid latex or the like, in automatically weighed quantities of prescribed quantity and weight, said mechanism including a container adapted to hold a supply of the liquid latex component adequate by weight for completing a run of foam generation of predetermined duration, connections between said container and said foam cell through which said liquid latex may be transferred from said container to said cell, and means to apply to the liquid in said container fluid pressure from a suitable source thereof at a uniform predetermined rate regardless of the diminution in weight of the charge of liquid latex in said container caused by withdrawal of liquid latex therefrom, thereby to effect said transfer, and mechanism to weigh said contained and diminishing liquid latex constantly, said weighing mechanism including a scale provided with a dial and a pointer adapted to furnish a visual indication of said weighing operation, an arm associated with said pointer, and means controlled by movements of said arm when a discrepancy occurs between the established weight rate of feed and the actual weight rate of feed, to vary the fluid pressure in said container from time to time, thereby to restore the actual weight rate of feed to conformity with said established rate.

2. Mechanism for supplying liquid latex or the like for utilization as an ingredient in a mix, said mechanism comprising means for feeding the liquid latex at a prescribed weight rate, by establishing fluid pressure in operative relation with a body of the liquid latex, means for continuously weighing said body of liquid latex to ascertain departures from the prescribed weight of feed, and means responsive to the weight of the body of latex for controlling the fluid pressure.

3. Mechanism for supplying liquid latex or the like for utilization as an ingredient in a mix, said mechanism comprising means for feeding the liquid latex at a prescribed weight rate, by establishing fluid pressure in operative relation with a body of the liquid latex, means for continuously weighing said body of liquid latex to ascertain departures from the prescribed weight of feed, and means to compensate for over-weight feed by bleeding said fluid pressure, and to compensate for under weight feed by making effective an increase in said fluid-pressure, said means for diminishing and increasing the pressure respectively, including a pair of solenoid operated valves, electric control circuits, one for each of said solenoids, and a device for completing said control circuits alternatively, said device being operated by connections from said weighing mechanism.

4. Mechanism for supplying liquid latex or the like for utilization as an ingredient in a mix, said mechanism comprising means for feeding the liquid latex at a prescribed weight rate, by establishing fluid pressure in operative relation with a body of the liquid latex, means for continuously weighing said body of liquid latex to ascertain departures from the prescribed weight of feed, and means to compensate for over-weight feed by bleeding said fluid pressure, and to compensate for under weight feed by making effective an increase in said fluid-pressure, said means for diminishing and increasing the pressure respectively, including a pair of solenoid operated valves, electric control circuits, one for each of said solenoids, and a device for completing said control circuits alternatively, said device being operated by an arm oscillated by said weighing mechanism and grounded electrically thereto, and a yoke carrying contact terminals insulated from each other, to be contacted by said arm, each of said contact terminals being included in one of said control circuits.

5. Mechanism for supplying liquid latex or the like for utilization as an ingredient in a mix, said mechanism comprising means for feeding the liquid latex at a prescribed weight rate, by establishing fluid pressure in operative relation with a body of the liquid latex, means for continuously weighing said body of liquid latex to ascertain departures from the prescribed weight of feed, and means to compensate for over-weight feed by bleeding said fluid pressure, and to compensate for under weight feed by making effective an increase in said fluid-pressure, said means for diminishing and increasing the pressure respectively, including a pair of solenoid operated valves, electric control circuits, one for each of said solenoids, and a device for completing said control circuits alternatively, said device being operated by an arm oscillated by said weighing mechanism and grounded electrically thereto, and a yoke carrying contact terminals insulated from each other, to be contacted by said arm, each of said contact terminals being included in one of said control circuits, means to mount said yoke pivotally under a gravity bias adapted to hold it out of the path of said arm and an electromagnet in an operating circuit adapted to be closed at times to bring said yoke to a position for engagement by said arm with either of said contact terminals.

6. Mechanism for supplying liquid latex or the like for utilization as an ingredient in a mix, said mechanism comprising means for feeding the liquid latex at a prescribed weight rate, by establishing fluid pressure in operative relation with a body of the liquid latex, means for continuously weighing said body of liquid latex to ascertain departures from the prescribed weight of feed, and means to compensate for over-weight feed by bleeding said fluid pressure, and to compensate for under weight feed by making effective an increase in said fluid-pressure, said means for diminishing and increasing the pressure respectively, including a pair of solenoid operated valves, electric control circuits, one for each of said solenoids, and a device for completing said control circuits alternatively, said device being operated by an arm oscillated by said weighing mechanism and grounded electrically thereto, and a yoke carrying contact terminals insulated from each other, to be contacted by said arm, each of said contact terminals being included in one of said control circuits, and a contact amplifier included at times in each of said control circuits and adapted to obviate burning out of said contact terminals.

7. Mechanism for supplying liquid latex or the like for utilization as an ingredient in a mix, said mechanism comprising means for feeding the liquid latex at a prescribed weight rate, by establishing fluid pressure in operative relation with a body of the liquid latex, means for continuously weighing said body of liquid latex to ascertain departures from the prescribed weight of feed, and means to compensate for over-weight feed by bleeding said fluid pressure, and to compensate for under weight feed by making effective an increase in said fluid-pressure, said compensating means including a pair of solenoid air valves, an electrical control circuit for each of said solenoids, and mechanism operated by said weighing means for closing said control circuits automatically at times.

8. Mechanism for supplying liquid latex or the like for utilization as an ingredient in a mix, said mechanism comprising means for feeding the liquid latex at a prescribed weight rate, by establishing fluid pressure in operative relation with a body of the liquid latex, means for continuously weighing said body of liquid latex to ascertain departures from the prescribed weight of feed, and means including control circuits to compensate for over-weight feed by bleeding said fluid pressure, and to compensate for under weight feed by making effective an increase in said fluid-pressure, and a set of timers included in operating circuits connected with said control circuits, said set comprising a first timer constructed and arranged to control the period of time between air applied operations; a second timer constructed and arranged to determine the duration of the period of time in which air is applied to feed the liquid latex; and a third timer which sets the length of time required to feed a particular batch of liquid latex into the mix.

9. Mechanism for supplying liquid latex or the like for utilization as an ingredient in a mix, said mechanism comprising means for feeding the liquid latex at a prescribed weight rate, by establishing fluid pressure in operative relation with a body of the liquid latex, means for continuously weighing said body of liquid latex to ascertain departures from the prescribed weight of feed, and means including control circuits to compensate for over-weight feed by bleeding said fluid pressure, and to compensate for under weight feed by making effective an increase in said fluid-pressure comprising solenoid operated air valves, and a set of timers included in operating circuits connected with said control circuits, said set comprising a first timer constructed and arranged to control the period of time between air applied operations; a second timer constructed and arranged to determine the duration of the period of time in which air is applied to feed the liquid latex; and a third timer which sets the length of time required to feed a particular batch of liquid latex into the mix, said timers being interconnected and acting as a governor to smooth out the operations of the solenoid air valves.

10. In an apparatus for producing vulcanized sponge rubber from latex foam or the like, a foam generator, mechanism to feed air and liquid latex thereto automatically in quantities of prescribed weight, means to mix the foam from said generator with a sensitizing ingredient and to discharge the mixed foam at a receiving station, a set of endless belts constructed and arranged to receive said foam at said station and confine it upon a movable surface provided by one of said endless belts, an oven disposed along the path of said movable surface, means to circulate heated air in said oven to vulcanize said foam, and means to strip said vulcanized foam from said movable surface upon its emergence from said oven and to deliver it for further treatment, and means to actuate said instrumentalities in timed relation comprising electrical motors included in electrical control circuits and means to start and stop said motors simultaneously, said starting and stopping means being operable at both ends of the path of said movable surface.

11. In an apparatus for producing vulcanized sponge rubber from latex foam or the like, a foam generator, mechanism to feed air and liquid latex thereto automatically in quantities of prescribed weight, means to mix the foam from said generator with a sensitizing ingredient and to discharge the mixed foam at a receiving station, means to weigh continuously the supply of liquid latex being delivered to said foam generator, and means to signal the operator of said apparatus by distinctive indicators when a given batch of the liquid latex is ready for feeding, also when a predetermined amount has been withdrawn, and finally when the entire supply has been used.

12. In an apparatus for generating foam from prescribed quantities by weight of liquid latex or the like, and prescribed quantities of a gaseous element, a foam cell, a battery of containers each adapted to contain a supply of liquid latex adequate for a run of given duration, connections between each of said containers and a source of fluid pressure adapted to transfer the liquid latex to said foam cell from a selected container of said battery, means to weigh said containers individually, and means to incapacitate for feeding a container not provided with the desired supply of liquid latex or the like.

13. In an apparatus for generating foam from prescribed quantities by weight of liquid latex or the like, and prescribed quantities of a gaseous element, a foam cell, a battery of containers each adapted to contain a supply of liquid latex adequate for a run of given duration, connections between each of said containers and a source of fluid pressure adapted to transfer the liquid latex to said foam cell from a selected container of said battery, means to weigh said containers individually, and means to incapacitate for feeding a container not provided with the desired supply of liquid latex or the like and means connected with the weighing mechanism of the container at any time in use, to control the fluid pressure and vary the same automatically to ensure continuous delivery of the prescribed weight of liquid latex.

14. In an apparatus for generating foam from prescribed quantities by weight of liquid latex or the like, and prescribed quantities of a gaseous element, foam cell, a battery of containers each adapted to contain a supply of liquid latex adequate for a run of given duration, connections between each of said containers and a source of fluid pressure adapted to transfer the liquid latex to said foam from a selected container of said battery, means to weigh said containers individually, and means to incapacitate for feeding a container not provided with the desired supply of liquid latex or the like, and a churning mechanism mounted on each of said containers and projecting into the body of liquid latex therein to stir the same at a rate of speed suitable to prevent coagulation of the latex in said body.

GEORGE W. BLAIR.
WILLIAM J. CLAYTON.
EDWARD H. CLARK.
JOHN F. SCHOTT.
ALEXIS W. KEEN.

REFERENCES CITED

The following references are of record in the file of this patent:

UNITED STATES PATENTS

| Number | Name | Date |
| --- | --- | --- |
| 598,400 | Taylor | Feb. 1, 1898 |
| 671,081 | Green | Apr. 2, 1901 |
| 694,146 | Fullner | Feb. 25, 1902 |
| 1,240,589 | Murray | Sept. 18, 1917 |
| 1,348,010 | Kimber | July 27, 1920 |
| 1,382,207 | McGuire | June 21, 1921 |
| 1,432,732 | Reed et al. | Oct. 17, 1922 |
| 1,432,735 | Reed et al. | Oct. 17, 1922 |
| 1,529,813 | Restein | Mar. 17, 1925 |
| 1,538,115 | Herring | May 19, 1925 |

(Other references on following page)

UNITED STATES PATENTS

| Number | Name | Date |
|---|---|---|
| 1,744,224 | Hirsch et al. | Jan. 21, 1930 |
| 1,803,031 | Mulholland | Mar. 11, 1926 |
| 1,823,611 | Drause | Sept. 15, 1931 |
| 1,886,030 | Lane | Nov. 1, 1932 |
| 1,929,470 | Ballard | Oct. 10, 1933 |
| 1,939,337 | Darby | Dec. 12, 1933 |
| 1,973,452 | Wadman et al. | Mar. 6, 1933 |
| 1,983,319 | Simpson | Dec. 4, 1934 |
| 1,993,082 | Blair et al. | Mar. 5, 1935 |
| 2,051,781 | Brown | Aug. 18, 1936 |
| 2,112,513 | Abbott Jr., et al. | Mar. 29, 1938 |
| 2,139,874 | Berry | Dec. 13, 1938 |
| 2,161,308 | Murphy et al. | June 6, 1939 |
| 2,164,812 | Frams et al. | July 4, 1939 |
| 2,185,913 | Foreman | Jan. 2, 1940 |
| 2,208,536 | Brown | July 16, 1940 |

FOREIGN PATENTS

| Number | Country | Date |
|---|---|---|
| 218,340 | Great Britain | July 7, 1924 |
| 471,899 | Great Britain | Sept. 13, 1937 |
| 647,732 | Germany | June 24, 1937 |